(12) United States Patent
Miyazaki et al.

(10) Patent No.: US 11,517,893 B2
(45) Date of Patent: Dec. 6, 2022

(54) ADSORBENT FOR ANIONIC SUBSTANCES, PRODUCTION METHOD FOR ADSORBENT FOR ANIONIC SUBSTANCES, PRODUCTION DEVICE FOR ADSORBENT FOR ANIONIC SUBSTANCES, AND RECOVERING METHOD FOR ANIONIC SUBSTANCES

(71) Applicant: JFR CO., LTD., Tokyo (JP)

(72) Inventors: Hiroshi Miyazaki, Tokyo (JP); Akira Fujino, Kamagaya (JP)

(73) Assignee: JFR CO., LTD., Tokyo (JP)

( * ) Notice: Subject to any disclaimer, the term of this patent is extended or adjusted under 35 U.S.C. 154(b) by 260 days.

(21) Appl. No.: 16/798,546

(22) Filed: Feb. 24, 2020

(65) Prior Publication Data

US 2020/0188900 A1 Jun. 18, 2020

Related U.S. Application Data

(63) Continuation of application No. PCT/JP2018/027477, filed on Jul. 23, 2018.

(30) Foreign Application Priority Data

Aug. 24, 2017 (JP) .............................. JP2017-161168
Jun. 20, 2018 (JP) .............................. JP2018-117466

(51) Int. Cl.
*B01J 47/014* (2017.01)
*B01J 41/10* (2006.01)
(Continued)

(52) U.S. Cl.
CPC .............. *B01J 41/02* (2013.01); *B01J 41/10* (2013.01); *B01J 47/014* (2017.01); *B01J 49/57* (2017.01);
(Continued)

(58) Field of Classification Search
CPC . B01J 41/02; B01J 41/10; B01J 47/014; B01J 49/57; B01J 20/28057; B01J 20/28076; B01J 20/3078; B01J 20/3085; B01J 20/3433; B01J 20/28011; B01J 3/00; B01J 20/10; B01J 20/3475; B01J 2/30; B01J 20/28002; C01B 25/265;
(Continued)

(56) References Cited

FOREIGN PATENT DOCUMENTS

JP S61-141930 A 6/1986
JP 2011-161398 A 8/2011
(Continued)

OTHER PUBLICATIONS

Vereshagin et al., "Granulated foam glass-ceramic material from zeolitic rocks," Construction and Building Materials 22 (2008) 999-1003. (Year: 2008).*
Notice of Reasons for Rejection issued to JP Application No. 2017-161168, dated Jan. 9, 2018; 9 pgs.
Notice of Decision of Rejection issued to JP Application No. 2017-161168, dated May 8, 2018; 12 pgs.
(Continued)

*Primary Examiner* — Anthony J Zimmer
(74) *Attorney, Agent, or Firm* — Maier & Maier, PLLC

(57) ABSTRACT

An adsorbent for phosphoric acid-based anionic substances, that contains foamed glass, and that has a Ca2p concentration of 7.5 atom % or more or a Na1s concentration of 5.0 atom % or less at the surface thereof as measured by XPS analysis, and a half-width of Si2p peak of 2.4 eV or more. The adsorbent can also have a specific surface area of 45 $m^2/g$ or more or a pore volume of 2.5 $cm^3/g$ or more as measured by mercury intrusion.

1 Claim, 10 Drawing Sheets

(51) Int. Cl.
    *B01J 41/02*        (2006.01)
    *B01J 49/57*        (2017.01)
    *C01B 25/26*        (2006.01)
    *C02F 1/28*         (2006.01)
    *C02F 101/10*     (2006.01)

(52) U.S. Cl.
    CPC ............ *C01B 25/265* (2013.01); *C02F 1/281* (2013.01); *C02F 1/288* (2013.01); *C02F 2101/105* (2013.01)

(58) Field of Classification Search
    CPC .... C02F 1/281; C02F 1/288; C02F 2101/105; C02F 2209/02; C02F 2209/44
    See application file for complete search history.

(56) References Cited

FOREIGN PATENT DOCUMENTS

| | | |
|---|---|---|
| JP | 2013-158727 A | 8/2013 |
| JP | 2015-013283 A | 1/2015 |
| JP | 2015-192977 A | 11/2015 |
| JP | 2016-155130 A | 9/2016 |

OTHER PUBLICATIONS

English translation of International Search Report and Written Opinion dated Oct. 30, 2018 in corresponding International application No. PCT/JP2018/027477; 14 pgs.

\* cited by examiner

ADSORBENT FOR ANIONIC SUBSTANCES, PRODUCTION METHOD FOR ADSORBENT FOR ANIONIC SUBSTANCES, PRODUCTION DEVICE FOR ADSORBENT FOR ANIONIC SUBSTANCES, AND RECOVERING METHOD FOR ANIONIC SUBSTANCES

FIELD

The present invention relates to an anionic substance-adsorbent, a method for producing an anionic substance-adsorbent, a device for producing an anionic substance-adsorbent, and a method for recovering anionic substances.

BACKGROUND

A technique for recycling industrially generated anionic substances (phosphate anion, fluorine, boric acid, etc.) has been conventionally demanded. Phosphorus for example is an essential element for the growth of farm products, and phosphoric acid has been conventionally used as a fertilizer. When phosphoric acid used as e.g. a fertilizer as described above flows into drainage as phosphate anion and flows into an enclosed water area, eutrophication occurs in the water area and an ecosystem changes due to the phenomenon. Damage to water and damage to the fishing industry occur due to such change in the ecosystem, which has been a problem.

On the other hand, phosphoric acid is generally produced using a phosphate rock as a raw material; however, phosphate rock reserves are limited, and it has been pointed out that phosphate rocks can run dry in the near future. Therefore, a technique for recovering and recycling phosphoric acid from a solution including phosphoric acid such as drainage has been required to solve the problems of damage to water and damage to the fishing industry due to phosphoric acid and to acquire a phosphorus resource effectively.

On the other hand, more than a million tons of used glass annually are not recycled and are discarded by e.g. reclamation in Japan. In particular, when producing home appliances made using a glass and automotive glasses such as a rearview mirror, a large amount of waste glass is generated. In addition, it is expected that a large amount of waste glass is further generated due to disposal of glass products such as solar panels in the future. These waste glasses are discarded by reclamation, but it has been concerned that reclamation causes, for example, the problem of contaminated land, and the problem of building waste disposal plants sometimes in the future. This waste problem has been currently a social problem, and it is required to find a novel method for effectively using waste glasses.

In these circumstances, Patent Document 1 supposes a method for producing a phosphate anion-adsorbent, the method including the step of heating treatment under pressure at a temperature of 110° C. or higher for 2 hours or more with foam glass immersed in an alkaline solution as a technique for using waste glasses and recovering phosphoric acid.

Patent Document 1: Japanese Unexamined Patent Application, Publication No. 2011-161398

SUMMARY

The anionic substance-adsorbent produced by the method described in Patent Document 1, however, has not had a sufficient ability to adsorb anionic substances yet and has room for improvement. In addition, production by the method described in Patent Document 1 requires a prolonged time, two hours or more, which is an industrial problem. In particular, a case where an ability to adsorb phosphate anion is used to the maximum degree has required 6 hours or more, which has required great production costs.

The present invention was made in view of the above circumstances, and an object thereof is to provide an anionic substance-adsorbent with an excellent ability to adsorb anionic substances, a method for producing the same, and a device for producing an anionic substance-adsorbent. Another object of the present invention is to provide a method for recovering anionic substances.

Means for Solving the Problems

The present inventors found that an excellent ability to adsorb anionic substances could be regulated by adjusting the concentration of Ca, the concentration of Na, and the amount of SiOX (X is hydrogen, sodium, calcium or the like) on the surface of an anionic substance-adsorbent. In addition, the present inventors have found that an anionic substance-adsorbent with a high ability to adsorb phosphate anion (hereinafter, can be simply referred to as "adsorbent") can be obtained in a shorter time by a high temperature alkali treatment or a high pressure treatment of foam glass in an alkaline solution, thereby completing the present invention. More specifically, the present invention provides the following.

(1) An anionic substance-adsorbent, comprising foam glass, a surface of the adsorbent exhibiting a Ca2p concentration of 7.5 at % or more or a Na1s concentration of 5.0 at % or less and a Si2p peak having a full width at half maximum of 2.4 eV or more in XPS analysis, wherein an amount of phosphate anion adsorbable by the adsorbent is 60 mg/g or more, calculated by absorptiometry, after stirring the adsorbent using a 3000 mg/L phosphate anion solution at 25° C. for 2 hours.

(2) The adsorbent according to (1), wherein a specific surface area is 45 m$^2$/g or more or a pore volume is 2.5 cm$^3$/g or more as determined by a mercury intrusion method.

(3) The adsorbent according to (1) or (2), wherein the density is 0.53 g/mL or less.

(4) A method for producing an anionic substance-adsorbent, the method comprising a step of treating a foam glass material in an alkaline solution containing an alkali metal hydroxide in an amount of 1 mol/L or more at a temperature of 140° C. or higher for a predetermined time, wherein a concentration of the alkali metal hydroxide, the temperature and the time are selected so that an amount of phosphate anion adsorbable by the adsorbent is 40 mg/g or more, calculated by absorptiometry, after stirring the adsorbent using a 3000 mg/L phosphate anion solution at 25° C. for 2 hours.

(5) The method according to (4), wherein the predetermined time is within 1.5 hours.

(6) The method according to (4) or (5), wherein the foam glass material has been foamed with a foaming agent including calcium carbonate.

(7) device for producing an anionic substance-adsorbent, the device comprising a means for treating a foam glass material in an alkaline solution containing an alkali metal hydroxide in an amount of 1 mol/L or more at a temperature of 140° C. or higher for a predetermined time, wherein a concentration of the alkali metal hydroxide, the temperature and the time are regulated so that an amount of phosphate anion adsorbable by the adsorbent is 40 mg/g or more, calculated by absorptiometry, after stirring the adsorbent using a 3000 mg/L phosphate anion solution at 25° C. for 2 hours.

(8) An anionic substance-adsorbent, comprising foam glass, a surface of the adsorbent exhibiting a Ca2p concentration of 3.0 at % or more or a Na1s concentration of 8.5 at % or less and a Si2p peak having a full width at half maximum of 2.4 eV or more in XPS analysis, wherein an amount of fluoride ion adsorbable by the adsorbent is 10 mg/g or more, calculated by a colorimetric method, after stirring the adsorbent using a 1000 mg/L fluoride ion solution at 25° C. for 2 hours.

(9) The adsorbent according to (8), wherein a specific surface area is 15 m$^2$/g or more or a pore volume is 1.5 cm$^3$/g or more as determined by a mercury intrusion method.

(10) The adsorbent according to (8) or (9), wherein the density is 0.65 g/mL or less.

(11) A method for producing an anionic substance-adsorbent, the method comprising a step of treating a foam glass material in an alkaline solution containing an alkali metal hydroxide in an amount of 1 mol/L or more at a temperature of 125° C. or higher for a predetermined time, wherein a concentration of the alkali metal hydroxide, the temperature and the predetermined time are selected so that an amount of fluoride ion adsorbable by the adsorbent is 10 mg/g or more, calculated by a colorimetric method, after stirring the adsorbent using a 1000 mg/L fluoride ion solution at 25° C. for 2 hours.

(12) The method according to (11), wherein the predetermined time is within 2 hours.

(13) The method according to (11) or (12), wherein the foam glass material has been foamed with a foaming agent including calcium carbonate.

(14) A device for producing an anionic substance-adsorbent, the device comprising a means for treating a foam glass material in an alkaline solution containing an alkali metal hydroxide in an amount of 1 mol/L or more at a temperature of 125° C. or higher for a predetermined time, wherein a concentration of the alkali metal hydroxide, the temperature and the predetermined time are regulated so that an amount of fluoride ion adsorbable by the adsorbent is 10 mg/g or more, calculated by a colorimetric method, after stirring the adsorbent using a 1000 mg/L fluoride ion solution at 25° C. for 2 hours.

(15) A method for recovering anionic substances, the method comprising the step of adsorbing anionic substances to an adsorbent according to (1) to (3) and (8) to (10), or an adsorbent produced by a method according to any of (4) to (6) and (11) to (13).

(16) An anionic substance adsorption material, in which anionic substances have been adsorbed to an adsorbent according to (1) to (3) and (8) to (10), or an adsorbent produced by a method according to any of (4) to (6) and (11) to (13).

(17) A pulverized material of the adsorption material according to (16).

(18) A method for producing an adsorbent for reuse of anionic substances, the method comprising the step of desorbing anionic substances from the adsorption material according to (16).

According to the present invention, it is possible to provide an anionic substance-adsorbent with an excellent ability to adsorb anionic substances, a method for producing the same, and a device for producing an anionic substance-adsorbent. In addition, according to the present invention, it is possible to provide a method for recovering anionic substances.

DETAILED DESCRIPTION

Mode for Carrying Out the Invention

Figure 1:
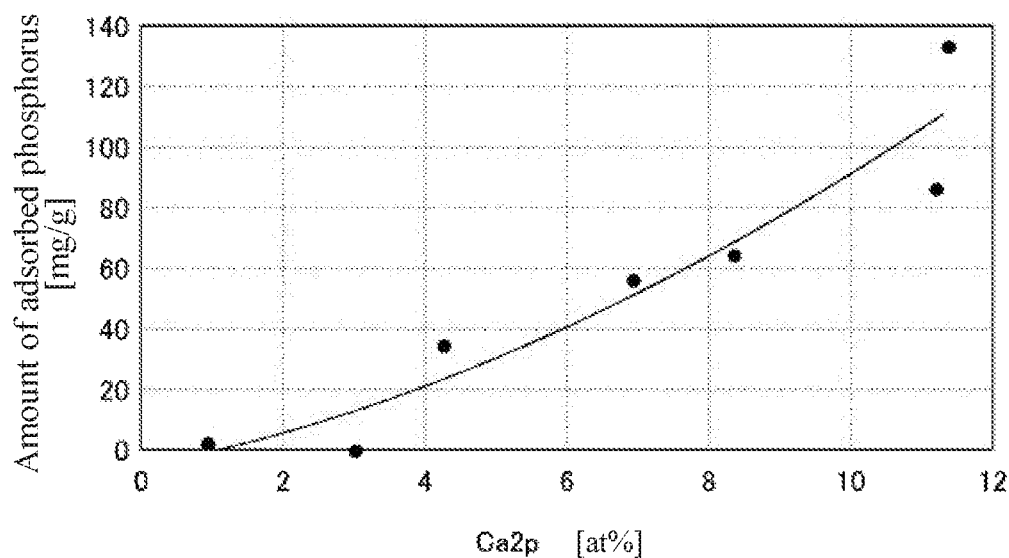
FIG. 1 is a graph which shows a relationship between the concentration of Ca2p on the surface of an adsorbent and the amount of adsorbed phosphorus.

Embodiments of the present invention will now be described. It should be noted, however, that the present invention is not limited thereto.

<Adsorbent for Phosphoric Acid-Based Anionic Substance>

The adsorbent for phosphoric acid-based anionic substance of the present invention contains foam glass, and has a Ca2p concentration of 6.0 at % or more or a Na1s concentration of 6.5 at % or less on the surface of the adsorbent by X-ray photoelectron spectroscopy (XPS) analysis, and has a full width at half maximum of the Si2p peak of 2.4 eV or more.

In addition, in one embodiment, the anionic substance-adsorbent of the present invention contains foam glass, and has a Ca2p concentration of 8.0 at % or more or a Na1s concentration of 5.0 at % or less on the surface of the adsorbent by X-ray photoelectron spectroscopy (XPS) analysis, and has a full width at half maximum of the Si2p peak of 2.4 eV or more.

Conditions of XPS measurement are as follows:

Used equipment: Scanning XPS analyzer (PHI 5000 VersaProbe II manufactured by ULVAC-PHI, Inc.), X-ray source: monochrome AlK α (1486.6 eV) ray, output 25 W, Analyzed area: 100 μmφ, and Pass energy: 187.85 eV (wide scan), 58.70 eV (narrow scan).

Because the concentration of Ca2p on the surface is high, 6.0 at % or more, the adsorbent of the present invention can effectively adsorb anionic substances, and particularly can effectively adsorb anionic substances in the high concentration range. In addition, the low Na1s concentration on the surface, 6.5 at % or less, is related to the high Ca2p concentration. When the amount of Na, which does not contribute to adsorption of anionic substances, is low and Ca is effectively exposed, anionic substances can be effectively adsorbed. Furthermore, the large full width at half maximum of the Si2p peak, 2.4 eV or more, shows that Si, which makes the basic skeleton of foam glass, forms more SiOX (X is hydrogen, sodium, calcium or the like) than $SiO_2$ on the surface of the adsorbent, and shows that, even when an alkali treatment is carried out at a high temperature, SiOX as the basic skeleton of foam glass is not destroyed and can function as an adsorbent. SiOX contributes to adsorption to anionic substances, and particularly can effectively adsorb anionic substances in the low concentration range. As described above, it has been revealed that an adsorbent having the concentration of Ca2p, the concentration of Na1s, and the full width at half maximum of the Si2p peak provided in the above ranges, can show an excellent ability to adsorb anionic substances in the whole concentration range of anionic substances from the low concentration range to the high concentration range.

From the above-described viewpoint, the concentration of Ca2p on the surface of the adsorbent of the present invention is 6.0 at % or more, preferably 7.5 at % or more, more preferably 9.2 at % or more, and further preferably 10.5 at % or more. On the other hand, the upper limit of the concentration of Ca2p may be, for example, 20 at % or less (18 at % or less, 16 at % or less, 14 at % or less or the like) depending on the adsorption ability required.

In addition, from the above-described viewpoint, the concentration of Na1s on the surface of the adsorbent of the present invention is 6.5 at % or less, preferably 5.0 at % or less, more preferably 3.8 at % or less, and further preferably 3.0 at % or less. On the other hand, the lower limit of the concentration of Na1s may be, for example, zero (not more than the detection limit value) or more (1.0 at % or more, 1.5 at % or more or the like) depending on the adsorption ability required.

In addition, from the above-described viewpoint, the full width at half maximum of the Si2p peak of the adsorbent of the present invention is 2.4 eV or more, preferably 2.7 eV or more, and more preferably 3.0 eV or more. On the other hand, the upper limit of the full width at half maximum of the Si2p peak may be, for example, 4.0 eV or less (3.8 eV or less, 3.6 eV or less or the like) depending on the adsorption ability required. It should be noted that the peak disappears when the basic skeleton is destroyed.

Furthermore, as the specific surface area or pore volume of the adsorbent of the present invention increases, the surface with an ability to adsorb anionic substances increases. From this viewpoint, the specific surface area of the adsorbent of the present invention by a mercury intrusion method is preferably 15 $m^2/g$ or more, more preferably 30 $m^2/g$ or more, more preferably 32 $m^2/g$ or more, further preferably 45 $m^2/g$ or more, still more preferably 60 $m^2/g$ or more, and particularly preferably 75 $m^2/g$ or more.

In addition, the pore volume of the adsorbent of the present invention by a mercury intrusion method is preferably 1.7 $cm^3/g$ or more, more preferably 2.0 $cm^3/g$ or more, more preferably 2.2 $cm^3/g$ or more, further preferably 2.5 $cm^3/g$ or more, still more preferably 3.0 $cm^3/g$ or more, and particularly preferably 3.5 $cm^3/g$ or more.

On the other hand, the upper limit of the specific surface area may be, for example, 200 $m^2/g$ or less, 150 $m^2/g$ or less depending on the adsorption ability required. The upper limit of the pore volume may be, for example, 8 $cm^3/g$ or less, 6 $cm^3/g$ or less depending on the adsorption ability required.

In addition, as the density of the adsorbent of the present invention decreases, the surface with an ability to adsorb anionic substances increases. From this viewpoint, the density of the adsorbent of the present invention is preferably 0.60 g/mL or less, more preferably 0.57 g/mL or less, more preferably 0.55 g/mL or less, even more preferably 0.53 g/mL or less, and still more preferably 0.50 g/mL or less. On the other hand, the lower limit of the density may be, for example, 0.1 g/mL or more (0.15 g/mL or more, 0.2 g/mL or more, 0.25 g/mL or more or the like) depending on the adsorption ability required.

The density (g/mL) of the adsorbent of the present invention is measured by the following method.

(1) 5 to 10 g of adsorbent (for example, an adsorbent with a particle diameter of 4 mm or more and 10 mm or less) is taken using a scale, (2) The taken adsorbent is immersed in water for about 10 minutes, (3) The adsorbent is drained into e.g. a colander 10 minutes after the onset of immersion, and water on the surface is removed with e.g. tissue, (4) The adsorbent is added to a measuring cylinder with water up to half of the maximum scale value and is sunk in water, (5) The volume of water when all the adsorbent is sunk below the water surface is measured, and an increment from the addition is calculated, and (6) The density is calculated using the following formula:

[density (g/mL)]=[mass of adsorbent (g)]/[increment in water volume (mL)].

In the adsorbent of the present invention, for example, the amount of phosphate anion adsorbable in a phosphate anion solution with a concentration of phosphate anion of 3000 mg/L (hereinafter, can be referred to as "high concentration phosphate anion solution") is 10.0 mg/g or more (20.0 mg/g or more, 30.0 mg/g or more, 40.0 mg/g or more, 50.0 mg/g or more, 60.0 mg/g or more, 70.0 mg/g or more, 80.0 mg/g or more, 90.0 mg/g or more, 100.0 mg/g or more, 110.0 mg/g or more, 120.0 mg/g or more, 130.0 mg/g or more, 140.0 mg/g or more, 150.0 mg/g or more, 160.0 mg/g or more or the like). On the other hand, the upper limit of the amount of phosphate anion adsorbable by the adsorbent may be, for example, 300 mg/g or less (250 mg/g or less, 200 mg/g or less, 150 mg/g or less, 100 mg/g or less, 50.0 mg/g or less or the like) depending on the ability to adsorb phosphate anion required. It should be noted that the amount of phosphate anion adsorbable by an anionic substance-adsorbent is just an indicator of the adsorption ability thereof (note that the amount of adsorbable phosphate anion can be simply referred to as amount of adsorbed phosphorus).

In the present invention, the amount of adsorbable phosphate anion in a phosphate anion solution (sodium dihydrogen phosphate) with a concentration of phosphate anion of 3000 mg/L is measured by the following method.

[Method for Calculating Amount of Adsorbable Phosphate Anion in High Concentration Phosphate Anion Solution]

(1) To a container, a predetermined amount of adsorbent (selected from 3 levels of mass, e.g. 2.50 g, 1.20 g, or 0.5 g) and 50 mL of a phosphate anion solution with a concentration of phosphate anion ($PO_4^{3-}$) of 3000 mg/L are added, (2) After addition, hydrochloric acid or a sodium hydroxide solution is added to the container to adjust pH, (3) After the pH adjustment, the container is stirred in a thermostatic bath set to 25° C. for 2 hours, (4) Centrifugation is carried out at 3000 rpm for 10 minutes after stirring and the concentration of phosphate anion in a supernatant liquid is measured with an absorptiometer by a molybdenum blue method, (5) The amount of adsorbable phosphate anion (mg/g) is found based on the measurement value, and (6) The above measurement in (1) to (5) is carried out at each of pH 4, pH 5, pH 6, pH 7 and pH 8, and the maximum value at pH 4 to 8 is used as the amount of adsorbable phosphate anion (mg/g). It should be noted that pH herein is measured after stirring for 2 hours in (3).

It should be noted that although the mass of an adsorbent (2.50 g, 1.20 g or 0.5 g) in (1) is selected optionally, it is required to select the mass with paying attention to the theoretical saturated adsorption amount of each adsorbent (the theoretical saturated adsorption amount of each adsorbent when using 50 mL of a 3000 mg/L phosphate anion solution is 2.50 g; 60 mg/g, 1.20 g; 125 mg/g, 0.5 g; 300 mg/g). That is, when measurement is carried out using the optionally selected mass of an adsorbent by the above procedure of (1) to (6) and the obtained measurement result falls below the theoretical saturated adsorption amount of the selected mass of the adsorbent, the measurement result is used; however, when the result is identical with the theoretical saturated adsorption amount, the adsorbable amount can be equal to or greater than it. Therefore, an adsorbent having a next lower mass is selected and measured again. Measurement is carried out in stages as described above, and the measurement accuracy of adsorption amounts rises thereby.

The adsorbent of the present invention is not particularly limited, as long as it is used to adsorb anionic substances. Examples of anionic substances to be adsorbed include phosphorus (e.g. phosphate anion), fluorine (e.g. fluoride ion), boric acid, and the like. The present invention is particularly suitable to adsorb phosphate anion and fluoride ion.

In addition, the adsorbent of the present invention may be formed from only foam glass having the above-described characteristics, or may include other substances and components. For example, the adsorbent of the present invention may include other substances having an ability to adsorb anionic substances (for example, foam glass different from foam glass having the above-described characteristics).

<Method for Producing Adsorbent for Phosphoric Acid-Based Anionic Substance According to First Embodiment>

The method for producing an adsorbent for phosphoric acid-based anionic substance according to a first embodiment has the step of treating a foam glass material in an alkaline solution including an alkali metal hydroxide in an amount of 1 mol/L or more at 140° C. or higher for a predetermined time (hereinafter can be referred to as "high temperature alkali treatment"). An adsorbent including foam glass having the above-described characteristics can be produced by this method. It should be noted that the step of surface adjustment described below may be carried out after the step of high temperature alkali treatment.

The foam glass material in the present invention is a glass having a plurality of pores, and can be produced, for example, by pulverizing a glass as a raw material, mixing the pulverized glass and a foaming agent and then burning the mixture. An example of the method for producing a foam glass material will now be described in more detail.

The type of glass as a raw material for the foam glass material in the present invention (hereinafter, can be referred to as "material glass") is not particularly limited, and examples thereof include soda-lime glass, borosilicate glass, aluminosilicate glass and the like. As the material glass, waste glasses derived from home appliances made using a glass such as liquid crystals and plasma displays and automotive glasses such as a rearview mirror may be used. The method for pulverizing a material glass is not particularly limited, and pulverization can be carried out using e.g. a commercially available vibrational mill. The particle diameter of a material glass after pulverization (hereinafter, can be referred to as "pulverized glass") is not particularly limited, and is preferably smaller so that a pulverized glass and a foaming agent are uniformly mixed. It is preferred that the particle diameter of a pulverized glass be 1 mm or less, for example, by screening a particle size using a sieve with an opening of 1 mm or less after pulverizing the material glass. It should be noted that "the particle diameter is X mm or less" in the description means particles which pass through a sieve with a sieve opening of X mm.

The type of foaming agent mixed with a pulverized glass is not particularly limited, and, for example, SiC, SiN, $CaCO_3$, or a material including e.g. $CaCO_3$ (e.g. shells, etc.) can be used. In particular, $CaCO_3$ including Ca and a material including e.g. $CaCO_3$ are preferably used because foam glass having the above-described characteristics is easily obtained. These foaming agents generate gas at a temperature at which glass is softened, and accordingly a large number of pores are formed in the inner part of the glass to produce a foam glass material. In addition, the concentration of Ca on a foam glass surface can be increased by using a foaming agent including Ca. The amount of foaming agent included is not particularly limited, and is preferably 0.1 to 5 wt %, and particularly preferably 0.2 to 2.0 wt %. As the reason, foaming sufficiently occurs and a reduction in the strength of a foam glass material due to excess foaming can be avoided within this range. In addition, when mixing a pulverized glass and a foaming agent, a material including at least one of calcium, magnesium and iron, for example, may be added separately from the foaming agent. Examples of such materials include calcium hydroxide, magnesium carbonate, magnesium hydroxide, rouge, ferrite and the like. The amount of these materials added is not particularly limited, and is preferably 1 to 20 wt %, and particularly preferably 5 to 15 wt %. An amount of adsorbed anionic substances (particularly phosphate anion and fluoride ion) is remarkably improved by adding these materials within the above ranges.

The burning temperature and time of the mixture of a material glass (pulverized glass) and a foaming agent may be properly set depending on the types of material glass and foaming agent so that the material glass will be adequately foamed. The burning temperature may be, for example, 600 to 1150° C., and is preferably 800 to 1000° C. particularly when soda-lime glass is used as a material glass. When the burning temperature is within the range, because a material glass is sufficiently softened to adequately form pores and the material glass is not too soft, clogging of the formed pores can be avoided. In addition, the burning time may be, for example, 1 to 60 minutes, and is preferably 5 to 10 minutes. When the burning time is within this range, foaming sufficiently occurs, and clogging of the formed pores and the disappearance of surface fineness due to foams sticking to each other can be avoided.

The form of a foam glass material is not particularly limited, and it may remain in the form of block, or may be pulverized. The particle diameter of the pulverized foam glass material is not particularly limited, and is preferably 2 cm or less. That is, the upper limit of the particle diameter of the pulverized foam glass material is 2 cm or less (1.8 cm or less, 1.6 cm or less, 1.5 cm or less, 1.4 cm or less, 1.3 cm or less, 1.2 cm or less, 1.1 cm or less, 1.0 cm or less, 0.9 cm or less, or the like). On the other hand, the lower limit of the particle diameter of the pulverized foam glass material is above 0.05 cm (0.06 cm or more, 0.08 cm or more, 0.1 cm or more, 0.2 cm or more, above 0.2 cm, 0.3 cm or more, 0.4 cm or more, 0.5 cm or more, 0.6 cm or more, 0.7 cm or more, 0.8 cm or more, 0.9 cm or more, 1.0 cm or more, 1.1 cm or more, or the like). It is desirable to set the particle diameter of the pulverized foam glass material as mentioned above because an ability to adsorb anionic substances is excellent, and handling properties of the foam glass material in actual use (for example, adding it to polluted water in which anionic substances are to be adsorbed, drawing it from the polluted water, and separating it from polluted sludge after drawing) are excellent.

[Step of High Temperature Alkali Treatment]

An alkaline solution used in a high temperature alkali treatment is a solution obtained by dissolving a solute, which is dissolved in water to generate hydroxy group, in water. The type of solute in an alkaline solution is not particularly limited, and, for example, a solution of one or more alkali selected from the group consisting of NaOH, KOH, $Na_2CO_3$ and $Ca(OH)_2$ can be used. Among these, an alkali metal hydroxide such as NaOH or KOH, a strong alkali, is particularly preferred.

The amount of alkali metal hydroxide in an alkaline solution (hereinafter can be referred to as the concentration of alkali metal hydroxide or simply alkali concentration) is 1 mol/L or more, preferably 2 mol/L or more, more preferably 3 mol/L or more, even more preferably 4 mol/L or more, and most preferably 5 mol/L or more to obtain foam glass having the above-described characteristics. In a conventional method for producing an adsorbent including foam glass, the amount of anionic substances adsorbed by foam glass is generally saturated even when the amount of alkali metal hydroxide is increased to 4 mol/L or more, for example. According to the method for producing the adsorbent of the present invention, however, it has been revealed that the amount of anionic substances adsorbed by foam glass can be increased as the amount of alkali metal hydroxide is increased, because the treatment is carried out at high temperature, 140° C. or higher. This can be due to various reasons, such as production in a conventional method, in which the reaction of a foam glass material and an alkali metal hydroxide is insufficient due to an insufficient temperature, and the concentration of Ca in a foam glass material is insufficient. On the contrary, when the method for producing the adsorbent of the present invention, satisfying the above-described conditions, makes it possible to increase the surface of foam glass having an ability to adsorb anionic substances and the amount of anionic substances adsorbed compared to that of conventional adsorbents. On the other hand, the upper limit of the amount of alkali metal hydroxide may be, for example, 19 mol/L or less (18 mol/L or less, 17 mol/L or less or the like) depending on the adsorption ability required.

The temperature of an alkaline solution is 140° C. or higher, more preferably 150° C. or higher, further preferably 160° C. or higher, still more preferably 170° C. or higher, and particularly preferably 180° C. or higher to obtain foam glass having the above-described characteristics. In a conventional method for producing an adsorbent including foam glass, it has been conceived that the amount of anionic substances adsorbed by foam glass is saturated even when the temperature of an alkaline solution is increased to 140° C. or higher.

According to the method for producing the adsorbent of the present invention, however, there is a large inflection point between 140° C. and 150° C., and the amount of anionic substances adsorbed by foam glass rapidly increases at 140° C. or higher. Specifically, Patent Document 1 reports that the amount of phosphate anion adsorbed in the saturation region is 56 mg/g (conditions: 140° C., 3 mol/L, 12 hours); however, the adsorbent by the production method of the present application exhibits the regions of temperature and concentration of an alkaline solution in which the amount of adsorbed phosphate anion is above 100 mg/g after treatment for an hour. In addition, some conditions bring the regions of temperature and concentration in which the amount is above 100 mg/g even when a time to treat an alkaline solution is less than an hour, for example about 30 minutes.

The method for producing the adsorbent of the present invention, satisfying the above-described conditions, makes it possible to increase the surface of foam glass having an ability to adsorb anionic substances increases and the amount of adsorbed anionic substances compared to that of conventional adsorbents. On the other hand, the upper limit of the temperature of an alkaline solution is not particularly limited; however, because energy consumption increases when the temperature is raised, the temperature may be, for example, 300° C. or lower (280° C. or lower, 260° C. or lower, or the like).

The time required for the treatment by an alkaline solution is within 1.5 hours (e.g. less than 1.5 hours, within 1.2 hours, 1.0 hour, less than 1.0 hour, within 50 minutes, 40 minutes, 30 minutes, 20 minutes, 10 minutes, 5 minutes, a minute, or the like). The method for producing the adsorbent of the present invention is simple and easy because foam glass having an excellent ability to adsorb anionic substances can be produced in such a short period of time. The lower limit of the treatment time under the above-described conditions may be, for example, 10 seconds or more, 30 seconds or more, a minute or more, 5 minutes or more, 10 minutes or more, 20 minutes or more, 30 minutes or more, 40 minutes or more, 50 minutes or more and an hour or more depending on the adsorption ability required.

It should be noted that in the production method of the present invention, the treatment temperature, alkali concentration and treatment time in the above-described step of high temperature alkali treatment can be properly regulated in the above ranges. In addition, the treatment temperature, alkali concentration and treatment time can be also regulated based on throughputs (the amount of adsorbed anionic substances [mg/g]) required in adsorption of anionic substances.

It should be noted that the above-described step of high temperature alkali treatment is preferably carried out under pressure. The method for applying pressure is not particularly limited, and pressure may be applied by using a device to apply pressure, or by heating with foam glass and an alkaline solution put in a closed container. In the former case, because the pressure applied can be optionally changed, the pressure applied can be increased even in a case where the heating temperature is relatively low. In the latter case, when an alkaline solution is heated to 100° C. or higher, pressure is applied to the alkaline solution due to the vapor pressure of water included in the alkaline solution. According to the latter method, pressure can be applied to an alkaline solution without using a special device.

It should be noted that, in a case where pressure is applied to an alkaline solution using a closed container, considering that the saturated vapor pressure of water at 110° C. is almost 1.4 atmospheres, and vapor leakage occurs slightly in the closed container, the pressure is preferably 1.2 atmospheres or more, further preferably 1.4 atmospheres or more, and particularly preferably 2 atmospheres or more. The upper limit of pressure in the present embodiment is not particularly restricted; however, it is preferred that pressure be applied without using the above-described device to apply pressure in view of costs. The upper limit is, for example, preferably 95 atmospheres or less, and further preferably 70 atmospheres or less. It should be noted that the saturated vapor pressure of water at 300° C. is almost 95 atmospheres.

It should be noted that the microstructure on the surface of foam glass can remain covered with a coating of an aqueous strong alkali solution (pH 13 to 14) by the above-described step of high temperature alkali treatment. In addition, when pH of a solution in which anionic substances are to be adsorbed is above 8.0, an ability to adsorb anionic substances can be remarkably reduced. A state in which the above coating of the aqueous strong alkali solution remains causes the pH of the target solution to raise to above pH 8.0 depending on the initial pH of a solution including target anionic substances. Therefore, it is desired that the step of removing a strong alkali coating be carried out subsequently to the step of high temperature alkali treatment.

Specifically, water washing is carried out using running water (for example, immersion in running water at 20 to 25° C. for an hour or more). Alternatively, the step is achieved by immersion in a dilute aqueous acid solution (for example, dilute hydrochloric acid, dilute sulfuric acid, dilute nitric acid or the like at 20 to 25° C. for 15 minutes or more). In addition, the step of removing a strong alkali coating is carried out so that the pH of liquid after immersion is 10 or less as a standard after immersing an adsorbent in pure water and stirring the obtained mixture for a constant time, (for example, 20 g of an adsorbent is immersed in 600 mL of pure water, and the obtained mixture is stirred with a shaker at 150 rpm for 3 minutes). However, optical pH varies depending on the initial pH of a solution including anionic substances, and is properly adjusted to 9.0 or less, 8.0 or less, 7.0 or less, 6.0 or less, or 5.0 or less.

As described above, when immersed in a solution including anionic substances, the anionic substance-adsorbent of the present invention has a small pH variation by the step of removing a strong alkali coating subsequent to the step of high temperature alkali treatment, and it is easy to control pH to adsorb anionic substances effectively thereby.

<Method for Producing Adsorbent for Phosphoric Acid-Based Anionic Substance According to Second Embodiment>

The method for producing an adsorbent for phosphoric acid-based anionic substance according to a second embodiment has the step of treating a foam glass material at high pressure in an alkaline solution under the condition of 100 atmospheres or more within 1.5 hours (hereinafter, can be referred to as "high pressure treatment"). In the description, "high pressure" indicates applying pressure at 100 atmospheres or more.

[Step of High Pressure Treatment]

The atmospheric pressure in the step of high pressure treatment is not particularly limited under the condition of 100 atmospheres or more, and the atmospheric pressure may be properly set depending on a desired adsorption ability of an adsorbent. The atmospheric pressure is, for example, preferably 200 atmospheres or more, more preferably 400 atmospheres or more, further preferably 600 atmospheres or more, even more preferably 800 atmospheres or more, and particularly preferably 1000 atmospheres or more from the viewpoint of obtaining foam glass with the above-described characteristics. On the other hand, the upper limit of pressure in the high pressure step may be, for example, 20000 atmospheres or less (15000 atmospheres or less, 10000 atmospheres or less, 5000 atmospheres or less, 2000 atmospheres or less, 1500 atmospheres or less, or the like). In addition, it is only required to be 100 atmospheres or more at least in a part of the high pressure step in the present invention, and the pressure step under the condition of less than 100 atmospheres may be also included.

The step of high pressure treatment is simple and easy because foam glass having an ability to adsorb anionic substances can be produced by applying high pressure (under the condition of 100 atmospheres or more) in a short period of time within 1.5 hours (e.g. within 1.2 hours, 1.0 hour, 50 minutes, 40 minutes, 30 minutes, 20 minutes, 10 minutes, 5 minutes, an minute, or the like). The lower limit of the high pressure time under the condition of 100 atmospheres or more may be properly set depending on a desired adsorption ability of an adsorbent. The lower limit is preferably, for example, 10 seconds or more, 30 seconds or more, a minute or more, 10 minutes or more, 30 minutes or more, and an hour or more, from the viewpoint of obtaining foam glass having the above-described characteristics.

For the high pressure treatment, for example, an ultra-high pressure device can be used. High pressure can be applied by a high pressure treatment using the above device with a foam glass material included in an alkaline solution in a closed container.

As the foam glass material used in the step of high pressure treatment, for example, a foam glass material obtained by foaming the above-described material glass can be used as described in the method for producing an anionic substance-adsorbent according to the first embodiment.

An alkaline solution used in the step of high pressure treatment is a solution obtained by dissolving a solute, which is dissolved in water to generate hydroxy group, in water. The type of solute in an alkaline solution is not particularly limited, and, for example, one or more solute selected from the group consisting of NaOH, KOH, $Na_2CO_3$ and $Ca(OH)_2$ can be used. Among these, NaOH or KOH, a strong alkali, is particularly preferred.

When the solute is NaOH or KOH, the concentration of an alkaline solution is preferably 0.5 mol/L or more, further preferably 3 mol/L or more, and further preferably 4 mol/L or more. When the concentration is 3 mol/L or more, the amount of adsorbed anionic substances (particularly phosphate anion) is particularly high, and when the concentration is 4 mol/L or more, the amount of adsorbed anionic substances (particularly phosphate anion) is further high. In addition, when the solute is NaOH or KOH, the concentration of an alkaline solution may be, for example, 19 mol/L or less (18 mol/L or less, 17 mol/L or less, or the like).

The temperature in the step of high pressure treatment is not particularly limited as long as the temperature is, for example, from room temperature to 200° C., and the temperature is preferably 80° C. or higher and more preferably 90° C. or higher from the viewpoint of obtaining an adsorbent having the above-described characteristics. The temperature can be regulated by the above-described device to apply pressure.

In the production of the anionic substance-adsorbent of the present invention, a known step different from the above-described step of high temperature alkali treatment and step of high pressure treatment may or may not be further included. Examples of such step can include a washing step.

The washing step can remove an alkaline solution adhering to foam glass after the above step of high temperature alkali treatment and step of high pressure treatment. The method for this washing is not particularly limited as long as an alkaline solution can be removed, and washing can be carried out using, for example, water, an acid solution or a pH buffer solution. In addition, when a case where an alkaline solution adheres to foam glass is not a problem, the step of washing treatment can be omitted.

<Device for Producing Adsorbent for Phosphoric Acid-Based Anionic Substance>

The present invention includes a device for producing an anionic substance-adsorbent, the device including a means for treating a foam glass material in an alkaline solution including an alkali metal hydroxide in an amount of 1 mol/L or more at 140° C. or higher for a predetermined time. The concentration of an alkali metal hydroxide may be 2 mol/L or more, 3 mol/L or more, 4 mol/L or more, 5 mol/L or more, and the treatment temperature of an alkaline solution may be 145° C. or higher, 150° C. or higher, 160° C. or higher, 180° C. or higher, 200° C. or higher.

In the method for producing an anionic substance-adsorbent, the present invention can use a device capable of heating treatment in an alkaline solution including an alkali metal hydroxide in an amount of 1 mol/L or more and having 140° C. or higher.

The concentration of an alkali metal hydroxide may be 2 mol/L or more, 3 mol/L or more, 4 mol/L or more, 5 mol/L or more, and the treatment temperature of an alkaline solution may be 145° C. or higher, 150° C. or higher, 180° C. or higher, 200° C. or higher.

In addition, the present invention includes a device for producing an anionic substance-adsorbent, the device including a means capable of applying high pressure to foam glass in an alkaline solution under the condition of 100 atmospheres or more within 1.5 hours.

In the method for producing an anionic substance-adsorbent, the present invention can use a device capable of applying high pressure, 100 atmospheres or more.

<Adsorbent for Fluorine-Based Anionic Substance>

The adsorbent for fluorine-based anionic substance of the present invention contains foam glass, and has a Ca2p concentration of 3.0 at % or more or a Na1s concentration of 8.5 at % or less on the surface of the adsorbent by X-ray photoelectron spectroscopy (XPS) analysis, and has a full width at half maximum of the Si2p peak of 2.4 eV or more.

In one embodiment, the anionic substance-adsorbent of the present invention contains foam glass, and has a Ca2p concentration of 5.0 at % or more or a Na1s concentration of 6.5 at % or less on the surface of the adsorbent by X-ray photoelectron spectroscopy (XPS) analysis, and has a full width at half maximum of the Si2p peak of 2.4 eV or more.

Conditions of XPS measurement are as follows:

Used equipment: Scanning XPS analyzer (PHI 5000 VersaProbe II manufactured by ULVAC-PHI, Inc.), X-ray source: monochrome AlK α (1486.6 eV) ray, output 25 W, Analyzed area: 100 μmφ, and Pass energy: 187.85 eV (wide scan), 58.70 eV (narrow scan).

The adsorbent of the present invention can effectively adsorb anionic substances, and particularly can effectively adsorb anionic substances in the high concentration range because the concentration of Ca2p on the surface is high, 3.0 at % or more. In addition, the low Na1s concentration on the surface, 8.5 at % or less, is relate to the high Ca2p concentration. When the amount of Na, which does not contribute to adsorption to anionic substances, is low and Ca is effectively exposed, anionic substances can be effectively adsorbed. Furthermore, the large full width at half maximum of the Si2p peak, 2.4 eV or more, shows that Si, which makes the basic skeleton of foam glass, forms more SiOX (X is hydrogen, sodium, calcium or the like) than $SiO_2$ on the surface of the adsorbent, and shows that SiOX as the basic skeleton of foam glass is not destroyed to function as an adsorbent even when an alkali treatment is carried out at a high temperature. SiOX contributes to adsorption to anionic substances, and particularly can effectively adsorb anionic substances in the low concentration range. As described above, it has been revealed that an adsorbent in which the concentration of Ca2p, the concentration of Na1s, and the full width at half maximum of the Si2p peak are provided in the above ranges, can show an excellent ability to adsorb anionic substances in the whole concentration range of fluorine-based anionic substances from the low concentration range to the high concentration range.

From the above-described viewpoint, the concentration of Ca2p on the surface of the adsorbent of the present invention is 3.0 at % or more, preferably 5.0 at % or more, more preferably 7.0 at % or more, and further preferably 9.0 at % or more. On the other hand, the upper limit of the concentration of Ca2p may be, for example, 20 at % or less (18 at % or less, 16 at % or less, 14 at % or less or the like) depending on the adsorption ability required.

In addition, from the above-described viewpoint, the concentration of Na1s on the surface of the adsorbent of the present invention is 8.5 at % or less, preferably 6.5 at % or less, more preferably 5.0 at % or less, and further preferably 3.5 at % or less. On the other hand, the lower limit of the concentration of Na1s may be, for example, zero (not more than the detection limit value) or more (1.0 at % or more, 1.5 at % or more or the like) depending on the adsorption ability required.

In addition, from the above-described viewpoint, the full width at half maximum of the Si2p peak of the adsorbent of the present invention is 2.4 eV or more, preferably 2.7 eV or more, and more preferably 3.0 eV or more. On the other hand, the upper limit of the full width at half maximum of the Si2p peak may be, for example, 4.0 eV or less (3.8 eV or less, 3.6 eV or less or the like) depending on the adsorption ability required. It should be noted that the peak disappears when the basic skeleton is destroyed.

Furthermore, as the specific surface area or pore volume in the adsorbent of the present invention increases, the surface with an ability to adsorb fluorine-based anionic substances increases. From this viewpoint, the specific surface area of the adsorbent of the present invention as determined by a mercury intrusion method is preferably 15 $m^2/g$ or more, more preferably 30 $m^2/g$ or more, more preferably 45 $m^2/g$ or more, and further preferably 58 $m^2/g$ or more. In addition, the pore volume of the adsorbent of the present invention as determined by a mercury intrusion method is preferably 1.5 $cm^3/g$ or more, more preferably 1.9 $cm^3/g$ or more, more preferably 2.3 $cm^3/g$ or more, and further preferably 2.7 $cm^3/g$ or more.

On the other hand, the upper limit of the specific surface area may be, for example, 200 $m^2/g$ or less, 150 $m^2/g$ or less depending on the adsorption ability required. The upper limit of the pore volume may be, for example, 8 $cm^3/g$ or less, 6 $cm^3/g$ or less depending on the adsorption ability required.

In addition, as the density in the adsorbent of the present invention decreases, the surface with an ability to adsorb anionic substances increases. From this viewpoint, the density of the adsorbent of the present invention is preferably 0.65 g/mL or less, more preferably 0.59 g/mL or less, more preferably 0.55 g/mL or less, and even more preferably 0.53 g/mL or less. On the other hand, the lower limit of the density may be, for example, 0.1 g/mL or more (0.15 g/mL or more, 0.2 g/mL or more, 0.25 g/mL or more or the like) depending on the adsorption ability required. It should be noted that the method for measuring density is the same as the method for measuring density described in the adsorbent for phosphoric acid-based anion.

In the adsorbent of the present invention, for example, the amount of adsorbable fluoride ion is 10.0 mg/g or more (20.0 mg/g or more, 30.0 mg/g or more, 40.0 mg/g or more, 50.0 mg/g or more, 60.0 mg/g or more, 70.0 mg/g or more, 80.0 mg/g or more, or the like) in a fluoride ion solution with a concentration of fluoride ion of 1000 mg/L (hereinafter, can be referred to as "high concentration fluoride ion solution"). On the other hand, the upper limit of the amount of fluoride ion adsorbable by the adsorbent may be for example 300 mg/g or less (250 mg/g or less, 200 mg/g or less, 150 mg/g or less, 100 mg/g or less, 50.0 mg/g or less or the like) depending on the ability to adsorb fluoride ion required. It should be noted that the amount of fluoride ion adsorbable by an anionic substance-adsorbent is just an indicator of the adsorption ability thereof (note that the amount of adsorbable fluoride ion can be simply referred to as amount of adsorbed fluorine).

In the present invention, the amount of adsorbable fluoride ion in a fluoride ion solution with a concentration of fluoride ion of 1000 mg/L is measured by the following method.

[Method for Calculating Amount of Adsorbable Fluoride Ion in High Concentration Fluoride Ion Solution]

(1) To a container, a predetermined amount of adsorbent (e.g. 0.5 g) and 50 mL of a sodium fluoride (NaF) solution with a concentration of fluoride ion (F—) of 1000 mg/L are added, (2) After addition, hydrochloric acid or a sodium hydroxide solution is added to the container to adjust pH, (3) After the pH adjustment, the container is stirred in a thermostatic bath set to 25° C. for 2 hours, (4) Centrifugation is carried out at 3000 rpm for 10 minutes after stirring and the concentration of fluoride ion in a supernatant liquid is measured by a colorimetric method, (5) The amount of adsorbable fluoride ion (mg/g) is found based on the measurement value, and (6) The above measurement in (1) to (5) is carried out at each of pH 3, pH 4, pH 5, pH 6 and pH 7, and the maximum value at pH 3 to 7 is used as the amount of adsorbable fluoride ion (mg/g). It should be noted that pH herein is measured after stirring for 2 hours in (3).

In addition, the adsorbent of the present invention may be formed from only foam glass having the above-described characteristics, or may include other substances and components. For example, the adsorbent of the present invention may include other substances having an ability to adsorb anionic substances (for example, foam glass different from foam glass having the above-described characteristics).

<Method for Producing Adsorbent for Fluorine-Based Anionic Substance According to Third Embodiment>

The method for producing an adsorbent for fluorine-based anionic substance according to a third embodiment has the step of treating a foam glass material in an alkaline solution including an alkali metal hydroxide in an amount of 1 mol/L or more at 125° C. or higher for a predetermined time (hereinafter, can be referred to as "high temperature alkali treatment"). An adsorbent including foam glass having the above-described characteristics can be produced by such method. It should be noted that the above-described step of surface adjustment may be carried out after the step of high temperature alkali treatment.

As the foam glass material in the present invention, foam glass identical with the above-described foam glass for phosphoric acids can be used. It should be noted that the form of a foam glass material is not particularly limited, and it may remain in the form of block, or may be pulverized. The particle diameter of the pulverized foam glass material is not particularly limited, and is preferably 2 cm or less. That is, the upper limit of the particle diameter of the pulverized foam glass material is 2 cm or less (1.8 cm or less, 1.6 cm or less, 1.5 cm or less, 1.4 cm or less, 1.3 cm or less, 1.2 cm or less, 1.1 cm or less, 1.0 cm or less, 0.9 cm or less, or the like). On the other hand, the lower limit of the particle diameter of the pulverized foam glass material is above 0.05 cm (0.06 cm or more, 0.08 cm or more, 0.1 cm or more, 0.2 cm or more, above 0.2 cm, 0.3 cm or more, 0.4 cm or more, 0.5 cm or more, 0.6 cm or more, 0.7 cm or more, 0.8 cm or more, 0.9 cm or more, 1.0 cm or more, 1.1 cm or more, or the like). It is desirable to set the particle diameter of the pulverized foam glass material as mentioned above, because an ability to adsorb anionic substances is excellent, and handling properties of a foam glass material in actual use (for example, adding it to polluted water in which anionic substances are to be adsorbed, drawing it from the polluted water, and separating it from polluted sludge after drawing) are excellent.

[Step of High Temperature Alkali Treatment]

An alkaline solution used in a high temperature alkali treatment is a solution obtained by dissolving a solute, which is dissolved in water to generate hydroxy group, in water. The type of solute in an alkaline solution is not particularly limited, and, for example, a solution of one or more alkali selected from the group consisting of NaOH, KOH, $Na_2CO_3$ and $Ca(OH)_2$ can be used. Among these, an alkali metal hydroxide such as NaOH or KOH, a strong alkali, is particularly preferred.

The amount of alkali metal hydroxide in an alkaline solution (hereinafter can be referred to as the concentration of an alkali metal hydroxide or simply alkali concentration) is 1 mol/L or more, preferably 2 mol/L or more, more preferably 3 mol/L or more, even more preferably 4 mol/L or more, and most preferably 5 mol/L or more to obtain foam glass having the above-described characteristics. According to the method for producing the adsorbent of the present invention, it has been revealed that the amount of anionic substances adsorbed by foam glass can be increased as the amount of alkali metal hydroxide is increased, because a treatment is carried out at high temperature, 125° C. or higher. The method for producing the adsorbent of the present invention, satisfying the above-described conditions, makes it possible to increase the surface of foam glass having an ability to adsorb anionic substances and the amount of adsorbed fluorine-based anionic substances compared to that of conventional adsorbents. On the other hand, the upper limit of the amount of alkali metal hydroxide may be, for example, 19 mol/L or less (18 mol/L or less, 17 mol/L or less or the like) depending on the adsorption ability required.

The temperature of an alkaline solution is 125° C. or higher, more preferably 130° C. or higher, 135° C. or higher, more preferably 140° C. or higher, further preferably 145° C. or higher, still more preferably 150° C. or higher, and particularly preferably 160° C. or higher from the viewpoint of obtaining foam glass having the above-described characteristics.

According to the method for producing the adsorbent of the present invention, a large inflection point appears around 140° C., and the amount of fluorine-based anionic substances adsorbed by foam glass rapidly increases at 140° C. or higher. In the adsorbent by the production method of the present application, there are the regions of temperature and concentration of an alkaline solution, in which the amount of fluoride ion adsorbed is above 50 mg/g by an hour treatment. In addition, some conditions bring the regions of temperature and concentration in which the amount is above 40 mg/g even for a treatment time of an alkaline solution of less than an hour, for example about 10 minutes.

The method for producing the adsorbent of the present invention, satisfying the above-described conditions, makes it possible to increase the surface of foam glass having an ability to adsorb fluorine-based anionic substances and the amount of adsorbed anionic substances compared to that of conventional adsorbents. On the other hand, the upper limit of the temperature of an alkaline solution is not particularly limited; however, because energy consumption increases when the temperature is raised, the temperature may be, for example, 300° C. or lower (280° C. or lower, 260° C. or lower, or the like).

The time required for the treatment by an alkaline solution is within 2 hours (e.g. less than 2 hours, within 1.5 hours, less than 1.5 hours, within 1.2 hours, 1.0 hour, less than 1.0 hour, within 50 minutes, 40 minutes, 30 minutes, 20 minutes, 10 minutes, 5 minutes, a minute, or the like). The method for producing the adsorbent of the present invention is simple and easy because foam glass having an excellent ability to adsorb fluorine-based anionic substances can be produced in such a short period of time. The lower limit of the treatment time under the above-described conditions may be, for example, 10 seconds or more, 30 seconds or more, a minute or more, 5 minutes or more, 10 minutes or more, 20 minutes or more, 30 minutes or more, 40 minutes or more, 50 minutes or more and an hour or more depending on the adsorption ability required.

It should be noted that in the production method of the present invention, the treatment temperature, alkali concentration and treatment time about the above-described step of high temperature alkali treatment can be properly regulated in the above ranges. The treatment temperature, alkali concentration and treatment time can be also regulated based on throughputs (the amount of adsorbed fluorine-based anionic substances [mg/g]) required in adsorption of fluorine-based anionic substances.

It should be noted that the above-described step of high temperature alkali treatment is preferably carried out under pressure. The method for applying pressure is the same as in the above-described step of high temperature alkali treatment for phosphoric acids. In addition, the step of removing a strong alkali coating may be carried out subsequently to the step of high temperature alkali treatment as in the case of the step of high temperature alkali treatment for phosphoric acids.

<Device for Producing Adsorbent for Fluorine-Based Anionic Substance>

The present invention includes a device for producing an anionic substance-adsorbent, the device including a means for treating a foam glass material in an alkaline solution including an alkali metal hydroxide in an amount of 1 mol/L or more at 125° C. or higher for a predetermined time. The concentration of an alkali metal hydroxide may be 2 mol/L or more, 3 mol/L or more, 4 mol/L or more, 5 mol/L or more, and the treatment temperature of an alkaline solution may be 130° C. or higher, 135° C. or higher, 140° C. or higher, 145° C. or higher, 150° C. or higher, 160° C. or higher.

In the method for producing an adsorbent for fluorine-based anionic substance, the present invention can use a device capable of heating treatment in an alkaline solution including an alkali metal hydroxide in an amount of 1 mol/L or more at 125° C. or higher.

The concentration of an alkali metal hydroxide may be 2 mol/L or more, 3 mol/L or more, 4 mol/L or more, 5 mol/L or more, and the treatment temperature of an alkaline solution may be 130° C. or higher, 135° C. or higher, 140° C. or higher, 145° C. or higher, 150° C. or higher, 160° C. or higher.

<Method for Recovering Anionic Substances>

The present invention includes a method for recovering anionic substances, the method having the step of adsorbing anionic substances to the above-described anionic substance-adsorbent.

As a method for adsorbing anionic substances to an adsorbent, for example, by immersing the above adsorbent in a solution including phosphate anion or fluoride ion, phosphate anion and fluoride ion in the solution can be adsorbed to the adsorbent.

As the solution including phosphate anion, a liquid including phosphate anion is not particularly limited, and examples thereof include domestic drainage, agricultural drainage and the like.

As the solution including fluoride ion, a liquid including fluoride ion is not particularly limited, and examples thereof include a semiconductor washing liquid, a hydrofluoric acid-containing solution used to process and wash glasses, and the like.

The pH of a solution including phosphate anion is not particularly limited, and is preferably 2.4 to 7.7, more preferably 2.8 to 7.7, and further preferably 3.8 to 7.5, and even more preferably 4.5 to 7.5. When the pH is within this range, the amount of phosphate anion adsorbed increases. In addition, when the pH of a solution including phosphate anion is outside the above range, it is preferred to include the step of pH adjustment to adjust the pH of the solution including phosphate anion within the above range by adding an acid or base.

The pH of a solution including fluoride ion is not particularly limited, and is preferably 1.4 to 7.2, more preferably 1.8 to 6.3, and further preferably 2.2 to 5.3. When the pH is within this range, the amount of fluoride ion adsorbed increases. In addition, when the pH of a solution including fluoride ion is outside the above range, it is preferred to include the step of pH adjustment to adjust the pH of the solution including fluoride ion within the above range by adding an acid or base.

After phosphate anion is adsorbed to an adsorbent, the adsorbent may be pulverized and used as a raw material for e.g. a phosphoric acid fertilizer or feed.

In addition, anionic substances may be recycled by desorbing the anionic substances (e.g. phosphate anion) from the adsorbent using a strong acid such as nitric acid in place of pulverizing the adsorbent. In this case, the concentration of strong acid is not particularly limited, and is preferably 0.01 mol/L or more, more preferably 0.05 mol/L or more, and further preferably 0.1 mol/L or more. In a case where the concentration is 0.05 mol/L or more, the recycle rate of anionic substances (particularly phosphate anion) increases, and in a case where the concentration is 0.1 mol/L, the recycle rate of anionic substances (particularly phosphate anion) particularly increases. In addition, the upper limit of the concentration of strong acid is not particularly limited, and may be, for example, 3 mol/L or less. It should be noted that an anionic substance-adsorbent from which anionic substances have been desorbed can adsorb anionic substances again.

EXAMPLES

Test Example 1

The adsorption ability of an adsorbent (the amount of adsorbed phosphate anion) was evaluated based on the concentration of Ca2p and the concentration of Na1s on the surface of the adsorbent by XPS analysis.

Conditions of XPS measurement were as follows:

Used equipment: Scanning XPS analyzer (PHI 5000 VersaProbe II manufactured by ULVAC-PHI, Inc.), X-ray source: monochrome AlK α (1486.6 eV) ray, output 25 W, Analyzed area: 100 μmφ, and Pass energy: 187.85 eV (wide scan), 58.70 eV (narrow scan).

Figure 3:
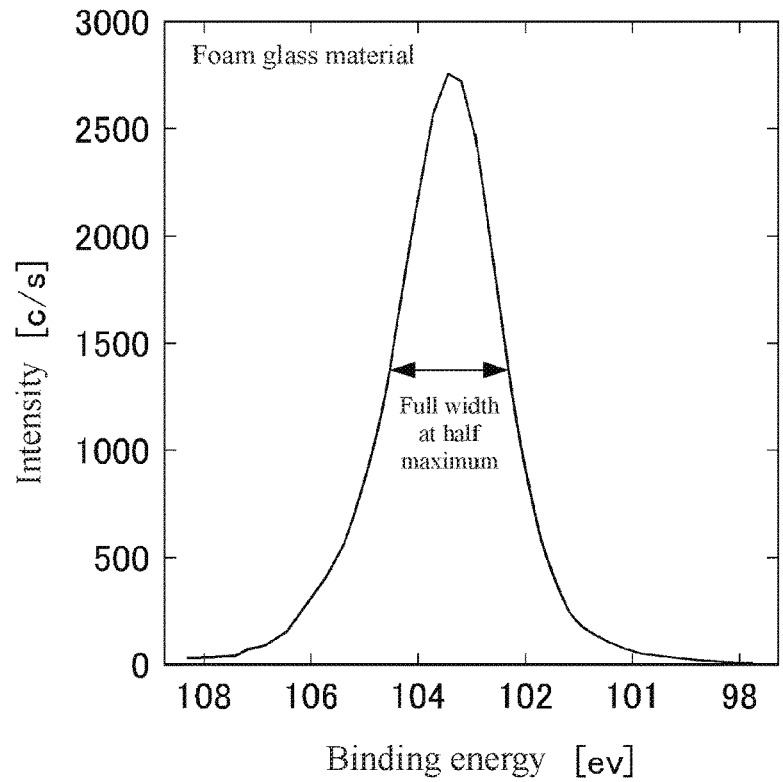
FIG. 3 is a graph which shows the XPS analysis results of a foam glass material.
Figure 4:
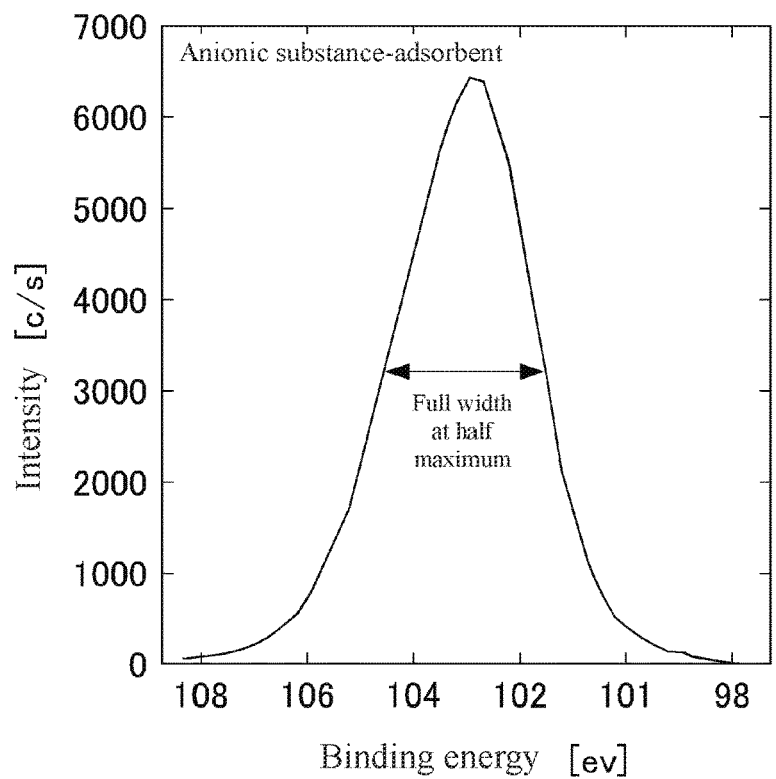
FIG. 4 is a graph which shows the XPS analysis results of an adsorbent (foam glass).

Specifically, a foam glass material A produced using calcium carbonate as a foaming agent was prepared. Next, this foam glass material A was subjected to a high temperature alkali treatment using a sodium hydroxide solution with a NaOH concentration of 5.5 mol/L while properly adjusting the treatment pressure, treatment temperature and treatment time to produce adsorbents in which the concentration of Ca2p and the concentration of Na1s on the foam glass surface were adjusted (the particle diameter of foam glass material A was 0.4 to 1.0 cm in diameter). The amounts of phosphate anion adsorbed by the adsorbents each having different Ca2p concentrations and Na1s concentrations were each measured by the [method for measuring amount of adsorbable phosphate anion in high concentration phosphate anion solution] described in the above-described "MODE FOR CARRYING OUT THE INVENTION." The results are shown as the amount of adsorbed phosphorus [mg/g] in FIG. 1 and FIG. 2. In addition, the peak region of Si2p of the foam glass material A by XPS analysis is shown in FIG. 3, and the peak region of Si2p of an adsorbent (foam glass) produced by a high temperature alkali treatment of the foam glass material A is shown in FIG. 4. The full width at half maximum of the Si2p peak of the foam glass material A was 2.2 eV (FIG. 3), and the full width at half maximum of the Si2p peak of the foam glass material A after the high temperature alkali treatment was 2.4 eV or more (FIG. 4).

Figure 2:
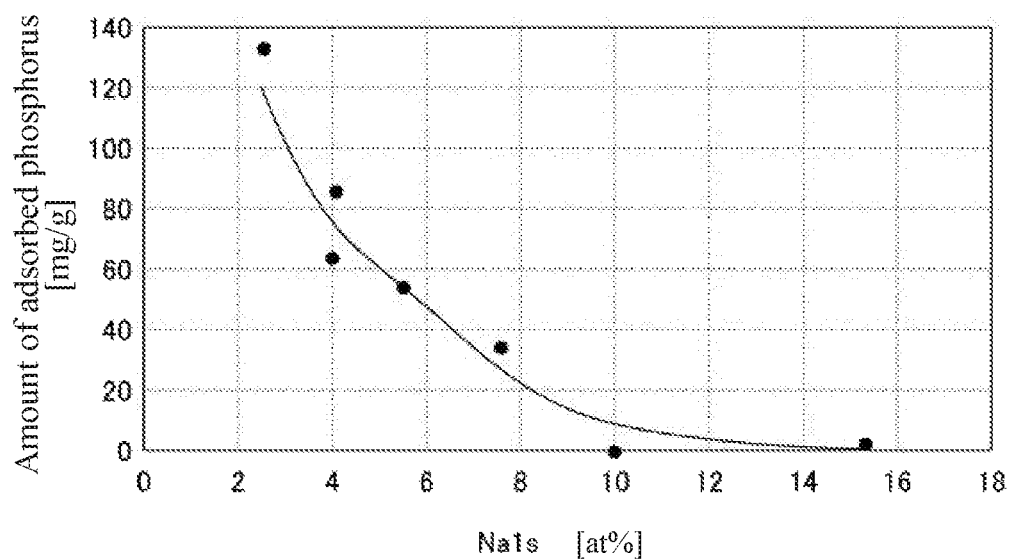
FIG. 2 is a graph which shows a relationship between the concentration of Na1s on the surface of an adsorbent and the amount of adsorbed phosphorus.

The results in FIG. 1 and FIG. 2 verified that as the concentration of Ca2p on the surface of an adsorbent increased, the amount of adsorbed phosphorus increased, and as the concentration of Na1s on the surface of an adsorbent decreased, the amount of adsorbed phosphorus increased. When the concentration of Ca2p was 6.0 at % or more and the concentration of Na1s was 6.5 at % or less on the surface of an adsorbent, the amount of adsorbable phosphate anion was 40 mg/g or more, which verified that an excellent adsorption ability was shown. In addition, when the concentration of Ca2p was 7.5 atom % or more and the concentration of Na1s was 5.0 atom % or less on the surface of an adsorbent, the amount of adsorbed phosphate anion was 60 mg/g or more, which verified that a more excellent adsorption ability was shown.

In addition, the results in FIG. 3 and FIG. 4 verified that the full width at half maximum in the foam glass material A was narrow due to increased —$SiO_2$ and decreased —SiOX, while the full width at half maximum in foam glass, which becomes an adsorbent, was large due to decreased —$SiO_2$ and increased —SiOX by the alkali treatment. In this adsorbent (foam glass) in which the full width at half maximum is 2.4 eV or more, —SiOX, the basic skeleton of glass, remains without being destroyed even after the alkali treatment, and this —SiOX contributes to the adsorption of phosphate anion to show an ability to adsorb phosphate anion.

Test Example 2

The amount of phosphate anion adsorbed by an adsorbent was evaluated based on the specific surface area and pore volume by a mercury intrusion method. In addition, the amount of phosphate anion adsorbed by an adsorbent was evaluated based on the density measured by the method described in the above-described "MODE FOR CARRYING OUT THE INVENTION."

Figure 6:
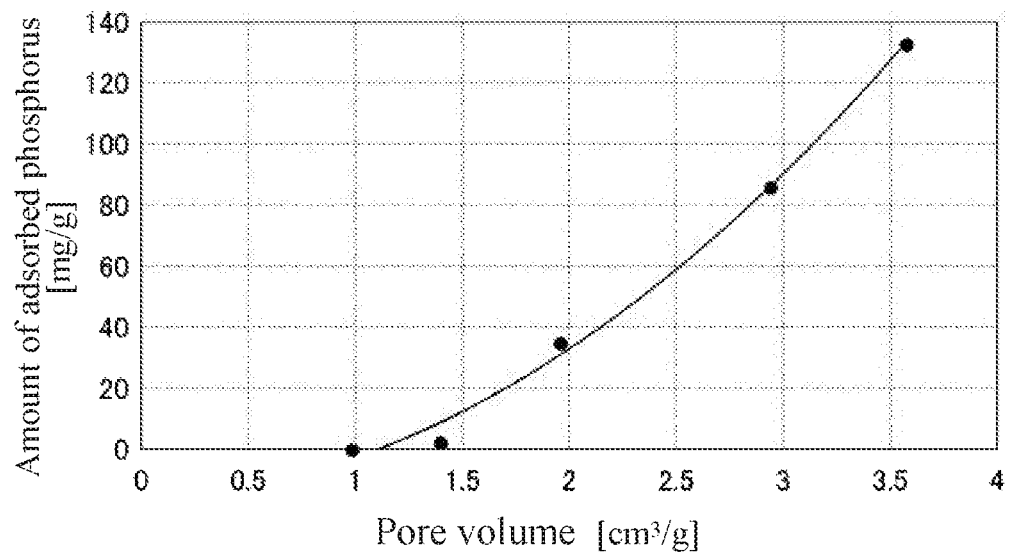
FIG. 6 is a graph which shows a relationship between the pore volume of an adsorbent and the amount of adsorbed phosphorus.
Figure 7:
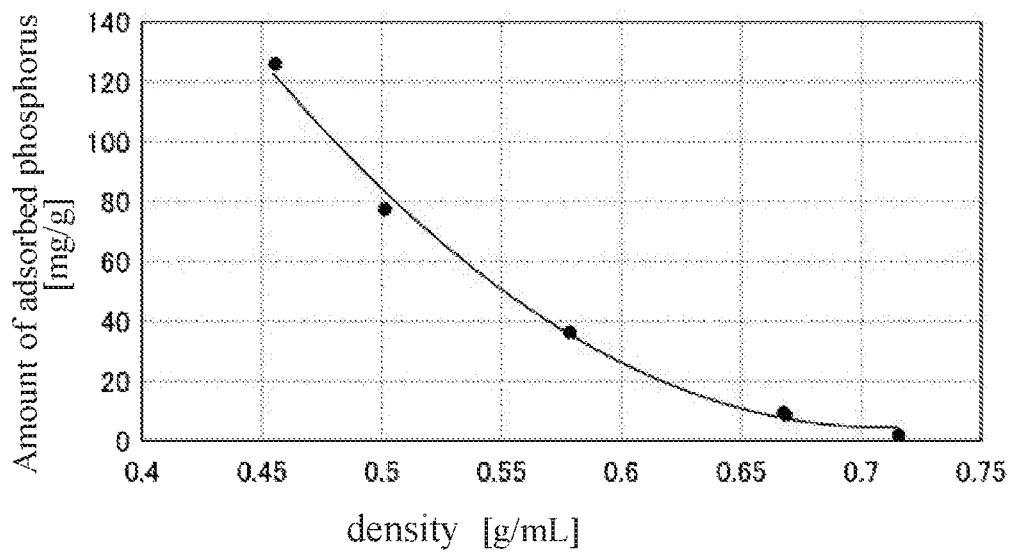
FIG. 7 is a graph which shows a relationship between the density of an adsorbent and the amount of adsorbed phosphorus.

Specifically, the foam glass material A prepared in Test Example 1 was subjected to a high temperature alkali treatment using a sodium hydroxide solution with a NaOH concentration of 5.5 mol/L while properly adjusting the treatment pressure, treatment temperature and treatment time to produce adsorbents in which the specific surface area, pore volume and density on the foam glass surface were adjusted. The amounts of phosphorus adsorbable by the adsorbents each having different specific surface areas, pore volumes and densities were each measured by the above-described [method for measuring amount of adsorbable phosphate anion in high concentration phosphate anion solution]. The results are shown as the amount of adsorbed phosphorus [mg/g] in FIG. 5 to FIG. 7.

Figure 5:
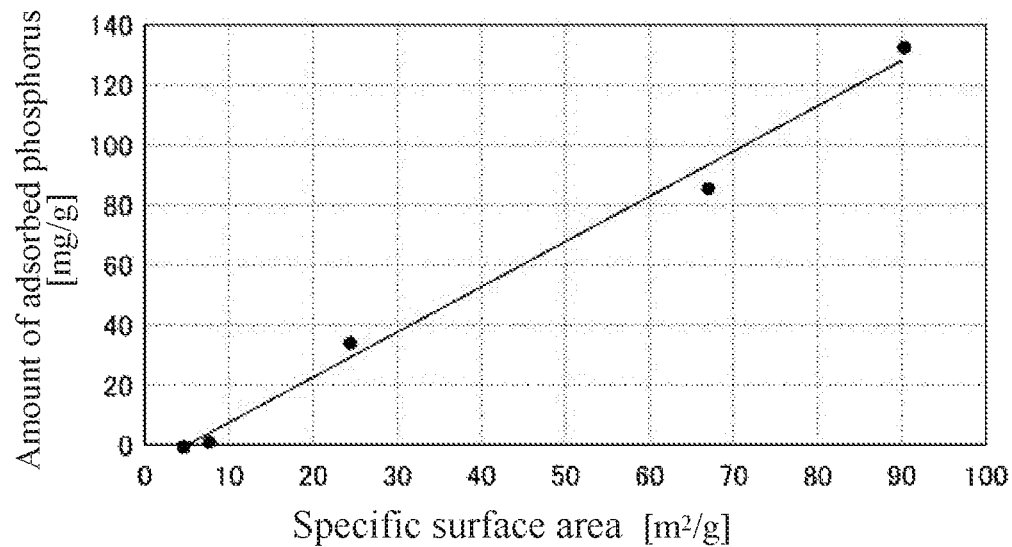
FIG. 5 is a graph which shows a relationship between the specific surface area of an adsorbent and the amount of adsorbed phosphorus.

The results in FIG. 5 verified that as the specific surface area of an adsorbent increased, the adsorbed phosphorus amount increased. In addition, the results in FIG. 6 verified that as the pore volume of an adsorbent increased, the amount of adsorbed phosphorus increased. In addition, the results in FIG. 7 verified that as the density of an adsorbent decreased, the amount of adsorbed phosphorus increased.

When at least one of the conditions that the specific surface area of an adsorbent be 32 m²/g or more, the pore volume was 2.2 cm³/g or more, or the density be 0.57 g/mL or less, the amount of adsorbable phosphate anion was 40 mg/g or more in all cases, which verified that an excellent ability to adsorb phosphate anion was shown.

In addition, when at least one of the conditions that the specific surface area of an adsorbent be 45 m²/g or more, the pore volume was 2.5 cm³/g or more, and the density be 0.53 g/mL or less, the amount of adsorbable phosphate anion was 60 mg/g or more in all cases, which verified that an excellent ability to adsorb phosphate anion was shown.

Test Example 3

Figure 8:
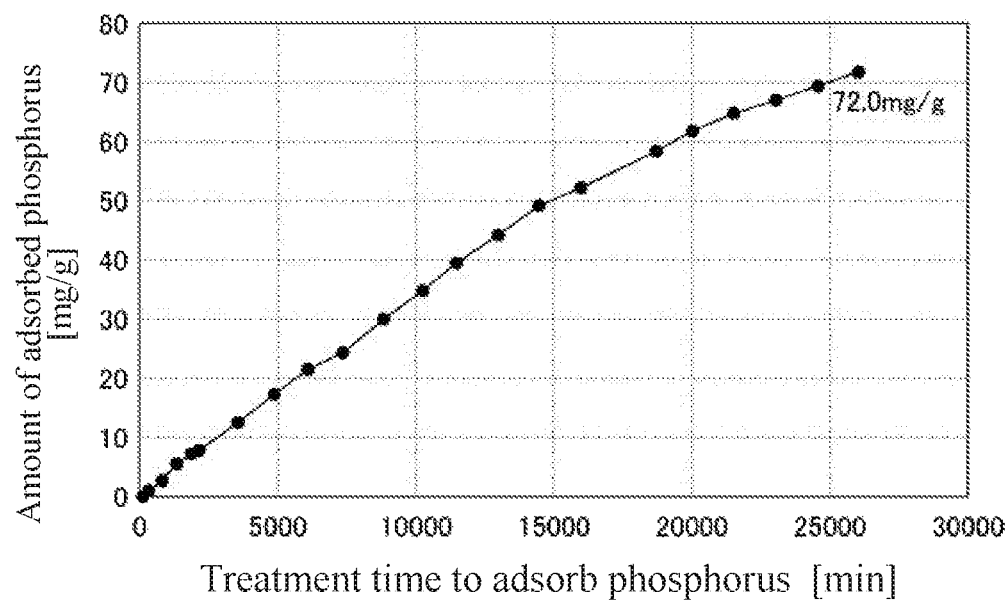
FIG. 8 is a graph which shows a relationship between the treatment time of an adsorbent to adsorb phosphorus and the amount of adsorbed phosphorus.

The foam glass material A used in Test Example 1 was subjected to a high temperature alkali treatment at a NaOH concentration of 5.0 mol/L, a treatment pressure of 5 atmospheres, a treatment temperature of 150° C. for a treatment time of 30 minutes to produce a foam glass with a density of 0.50 g/mL. When the foam glass was used as an adsorbent and measurement was carried out by the above-described [method for measuring amount of adsorbable phosphate anion in high concentration phosphate anion solution], the amount of adsorbable phosphate anion was 77.8 mg/g. Using this adsorbent, the amount of adsorbable phosphate anion was measured by the [method for measuring amount of adsorbable phosphate anion in low concentration phosphate anion solution] described below. The results are shown in FIG. 8.

[Method for Measuring Amount of Adsorbable Phosphate Anion in Low Concentration Phosphate Anion Solution]

(1) A column filled with 2.50 g of adsorbent, and a water tank with 500 mL of a phosphate anion solution with a concentration of phosphate anion ($PO_4^{3-}$) of 30 mg/L are prepared.

(2) The phosphate anion solution in the water tank is allowed to flow using a pump at a flow rate of 1.0 mL/min in a direction from the lower part to the upper part of the column. The solution having passed through the column is recycled in the water tank again, and circulation between the water tank and the column is repeated. In addition, the pH of the phosphate anion solution is adjusted by adding hydrochloric acid or a sodium hydroxide solution during circulation.

(3) The phosphate anion solution in the water tank is collected after a lapse of a constant time from the onset of operation and measured with an absorptiometer by a molybdenum blue method.

(4) The amount of adsorbed phosphate anion (mg/g) is found based on the measurement value.

(5) The concentration of $PO_4^{3-}$ in the phosphate anion solution in the water tank is adjusted to 30 mg/L.

(6) The operation from (2) to (5) is repeated until the amount of phosphate anion adsorbed by the adsorbent is saturated.

(7) The total amount of adsorbed phosphate anion until saturation is used as the amount of adsorbable phosphate anion (mg/g).

It should be noted that the method for adjusting pH in (2) above is based on the above-described "method for calculating amount of adsorbable phosphate anion in high concentration phosphate anion solution."

As can be seen from the results in FIG. 8, also in the measurement of the amount of adsorbable phosphate anion in a low concentration phosphate anion solution, the value was above 72.0 mg/g in 25000 minutes. That is, the achievement rate of the adsorbed phosphorus amount in a low concentration phosphate anion solution to that in a phosphate anion solution in the high concentration range is 72.0 (mg/g)/77.8 (mg/g)×100=92.5 (%). This verified that the adsorbent used in Test Example 3 showed an excellent ability to adsorb phosphate anion in the whole concentration range of a phosphate anion solution from the low concentration range to the high concentration range.

Test Example 4

In Test Example 4, the ability to adsorb fluoride ion of an adsorbent was examined.

Specifically, 0.2 g of the adsorbent produced in Test Example 1 (Ca2p concentration: 11.4 at %, Na1s concentration: 2.5 at %) and 20 mL of a sodium fluoride solution with a fluoride ion concentration shown in Table 1 were added to a container. The pH is adjusted to a desired pH by adding hydrochloric acid or a sodium hydroxide solution to the container. After pH adjustment, the container was stirred for a constant time in a thermostatic bath set to 25° C. Centrifugation was carried out at 3000 rpm for 10 minutes after stirring, and the concentration of fluoride ion in a supernatant liquid was measured by a colorimetric method. The amount of adsorbed fluoride ion [mg/g] was calculated based on this measurement value. The results are shown in Table 1.

TABLE 1

| Concentration of fluoride ion in sodium fluoride solution [mg/L] | Stirring time [hour] | pH | Amount of adsorbed fluoride ion [mg/g] |
|---|---|---|---|
| 10000 | 48 | 2.2 | 846 |
| 15000 | 20 | 5.3 | 1070 |

The results in Table 1 verified that the adsorbent produced in Test Example 1 showed an excellent ability to adsorb not only phosphate anion but also fluoride ion.

Test Example 5

In Test Example 5, when a foam glass material was subjected to an alkali treatment, the influence of the concentration of NaOH and temperature of an alkaline solution on the amount of phosphate anion adsorbed was examined.

Specifically, the foam glass material A used in Test Example 1 was subjected to an alkali treatment for an hour while properly adjusting the concentration of NaOH in an alkaline solution to 1.0 to 6.5 mol/L, the temperature of the alkaline solution to 80 to 210° C., the treatment pressure to 0.5 to 20 atmospheres (pressure was applied by the vapor pressure of water using a closed container) to produce foam glasses. A foam glass produced in each of these conditions was used as an adsorbent, and the amount of phosphate anion adsorbable by the adsorbent was measured by the above-described [method for measuring amount of adsorbable phosphate anion in high concentration phosphate anion solution]. The results are shown as the amount of adsorbed phosphorus [mg/g] in FIG. 9 and FIG. 10.

Figure 9:
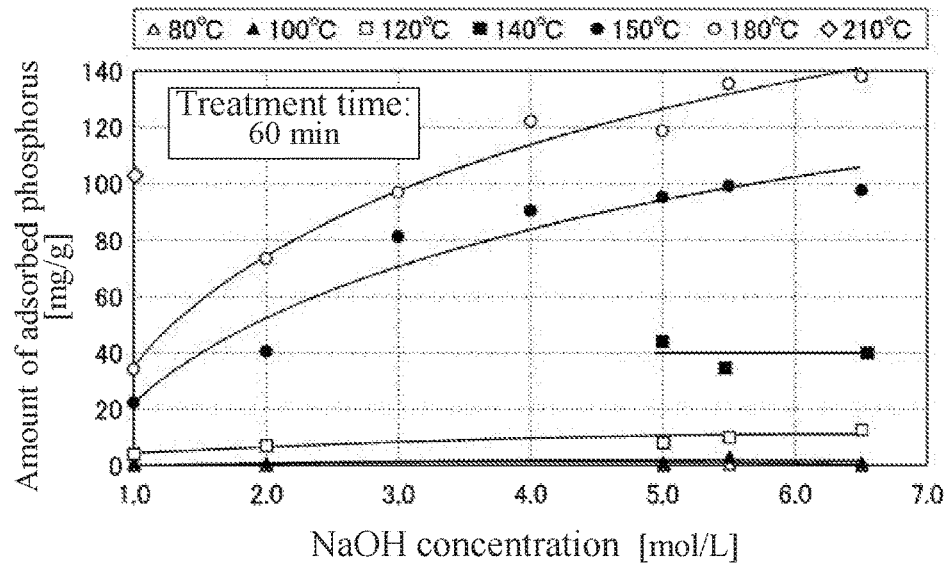
FIG. 9 is a graph which shows a relationship between the concentration of NaOH in an alkaline solution and the amount of adsorbed phosphorus.
Figure 10:
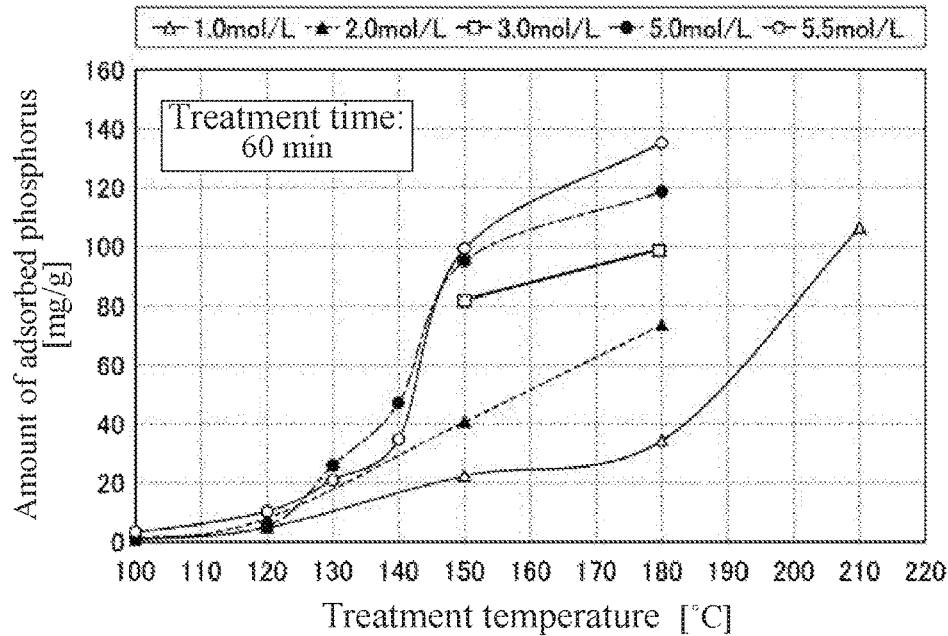
FIG. 10 is a graph which shows a relationship between the temperature of an alkaline solution and the amount of adsorbed phosphorus.

As can be seen from the results in FIG. 9 and FIG. 10, in a case where foam glass obtained by an alkali treatment at an alkaline solution temperature (treatment temperature) of 140° C. or higher and a NaOH concentration in an alkaline solution of 5.0 mol/L or more for 60 minutes was used as an adsorbent, the amount of adsorbed phosphorus considerably increased compared to that of a case where the temperature of an alkaline solution was 120° C. or lower. From this it is found that an adsorbent produced by a high temperature alkali treatment on the conditions that the temperature of an alkaline solution be 140° C. or higher showed an excellent ability to adsorb phosphate anion, 40 mg/g or more.

It is also found that even a case where foam glass obtained by an alkali treatment at an alkaline solution temperature (treatment temperature) of 150° C. or higher and a NaOH concentration in an alkaline solution of 1.5 mol/L or more for 60 minutes was used as an adsorbent, showed an excellent ability to adsorb phosphate anion, 40 mg/g or more.

In particular, it is found that a case where foam glass obtained by an alkali treatment at an alkaline solution temperature (treatment temperature) of 150° C. or higher and a NaOH concentration in an alkaline solution of 2.4 mol/L or more for 60 minutes was used as an adsorbent, showed a more excellent ability to adsorb phosphate anion, 60 mg/g or more.

In particular, it is found that a case where foam glass obtained by an alkali treatment at an alkaline solution temperature (treatment temperature) of 150° C. or higher and a NaOH concentration in an alkaline solution of 5.7 mol/L or more for 60 minutes was used as an adsorbent, showed a particularly excellent ability to adsorb phosphate anion, 100 mg/g or more.

It is also found that even a case where foam glass obtained by an alkali treatment at an alkaline solution temperature (treatment temperature) of 180° C. or higher and a NaOH concentration in an alkaline solution of 1.2 mol/L or more for 60 minutes was used as an adsorbent, showed an excellent ability to adsorb phosphate anion, 40 mg/g or more.

In particular, it is found that a case where foam glass obtained by an alkali treatment at an alkaline solution temperature (treatment temperature) of 180° C. or higher and a NaOH concentration in an alkaline solution of 1.5 mol/L or more for 60 minutes was used as an adsorbent, showed an excellent ability to adsorb phosphate anion, 60 mg/g or more.

In particular, it is found that a case where foam glass obtained by an alkali treatment at an alkaline solution temperature (treatment temperature) of 180° C. or higher and a NaOH concentration in an alkaline solution of 3.2 mol/L or more for 60 minutes was used as an adsorbent, showed a particularly excellent ability to adsorb phosphate anion, 100 mg/g or more.

It is also found that even a case where foam glass obtained by an alkali treatment at an alkaline solution temperature (treatment temperature) of 210° C. or higher and a NaOH concentration in an alkaline solution of 1.0 mol/L or more for 60 minutes was used as an adsorbent, showed an excellent ability to adsorb phosphate anion, 40 mg/g or more (60 mg/g or more, 100 mg/g or more).

Test Example 6

In Test Example 6, when a foam glass material is subjected to an alkali treatment, a relationship between the treatment time and the amount of adsorbed phosphate anion was examined.

Specifically, the foam glass material A used in Test Example 1 was subjected to an alkali treatment while adjusting the concentration of NaOH in an alkaline solution to 1.0 to 6.5 mol/L, the temperature of an alkaline solution to 130 to 210° C., the treatment pressure to 3 to 20 atmospheres (pressure was applied by the vapor pressure of water using a closed container) to produce foam glasses. A foam glass produced in each of these conditions was used as an adsorbent, and the amount of adsorbable phosphate anion was measured by the above-described [method for measuring amount of adsorbable phosphate anion in high concentration phosphate anion solution]. The results are shown as the amount of adsorbed phosphorus [mg/g] in Table 2 and FIG. 11 (Table 2 also includes the test results shown in FIGS. 1 to 7 and FIGS. 9 to 10).

TABLE 2

| Treatment temperature [° C.] | Treatment pressure [atmosphere] | NaOH concentration [mol/L] | Treatment time [min] | Amount of adsorbed phosphorus [mg/g] | Ca2p [at %] | Na1s [at %] | Specific surface area [m²/g] | Pore volume [cm³/g] | Specific gravity [g/mL] |
|---|---|---|---|---|---|---|---|---|---|
| untreated | untreated | untreated | untreated | 0.0 | 3.0 | 10.0 | 4.7 | 1.0 | — |
| 80 | 0.5 | 1.0 | 60 | 0.0 | — | — | — | — | — |
| 80 | 0.5 | 2.0 | 60 | 0.1 | — | — | — | — | — |
| 80 | 0.5 | 5.0 | 60 | 0.6 | — | — | — | — | — |
| 80 | 0.5 | 5.5 | 60 | 0.9 | — | — | — | — | — |
| 80 | 0.5 | 5.5 | 60 | 0.9 | — | — | — | — | — |
| 100 | 1.0 | 1.0 | 60 | 0.8 | — | — | — | — | — |
| 100 | 1.0 | 2.0 | 60 | 0.7 | — | — | — | — | — |
| 100 | 1.0 | 5.0 | 60 | 1.3 | — | — | — | — | — |
| 100 | 1.0 | 5.5 | 60 | 2.1 | 0.9 | 15.3 | 7.5 | 1.4 | 0.72 |
| 100 | 1.0 | 5.5 | 60 | 3.3 | — | — | — | — | — |
| 100 | 1.0 | 6.5 | 60 | 1.7 | — | — | — | — | — |
| 120 | 2.0 | 1.0 | 60 | 4.8 | — | — | — | — | — |
| 120 | 2.0 | 2.0 | 60 | 7.9 | — | — | — | — | — |
| 120 | 2.0 | 5.0 | 60 | 9.3 | — | — | — | — | 0.72 |
| 120 | 2.0 | 5.5 | 60 | 10.3 | — | — | — | — | 0.67 |
| 120 | 2.0 | 5.5 | 60 | 10.3 | — | — | — | — | — |
| 120 | 2.0 | 6.5 | 60 | 12.6 | — | — | — | — | — |
| 130 | 3.0 | 5.0 | 60 | 25.9 | — | — | — | — | — |
| 130 | 3.0 | 5.5 | 60 | 20.9 | — | — | — | — | — |

TABLE 2-continued

| Treatment temperature [° C.] | Treatment pressure [atmosphere] | NaOH concentration [mol/L] | Treatment time [min] | Amount of adsorbed phosphorus [mg/g] | Ca2p [at %] | Na1s [at %] | Specific surface area [m²/g] | Pore volume [cm³/g] | Specific gravity [g/mL] |
|---|---|---|---|---|---|---|---|---|---|
| 130 | 3.0 | 6.5 | 60 | 30.2 | — | — | — | — | — |
| 140 | 4.0 | 4.0 | 240 | 53.8 | 7.0 | 5.3 | — | — | — |
| 140 | 4.0 | 5.0 | 60 | 47.1 | — | — | — | — | — |
| 140 | 4.0 | 5.5 | 60 | 34.6 | 4.3 | 7.6 | 24.3 | 2.0 | — |
| 140 | 4.0 | 5.5 | 60 | 34.6 | — | — | — | — | — |
| 140 | 4.0 | 6.5 | 80 | 36.8 | — | — | — | — | 0.58 |
| 150 | 5.0 | 1.0 | 60 | 22.3 | — | — | — | — | — |
| 150 | 5.0 | 2.0 | 60 | 40.6 | — | — | — | — | — |
| 150 | 5.0 | 3.0 | 60 | 81.5 | — | — | — | — | — |
| 150 | 5.0 | 4.0 | 60 | 90.4 | — | — | — | — | — |
| 150 | 5.0 | 5.0 | 10 | 24.5 | — | — | — | — | — |
| 150 | 5.0 | 5.0 | 30 | 77.8 | — | — | — | — | 0.50 |
| 150 | 5.0 | 5.0 | 60 | 95.1 | — | — | — | — | — |
| 150 | 5.0 | 5.0 | 90 | 98.2 | — | — | — | — | — |
| 150 | 5.0 | 5.0 | 120 | 105.4 | — | — | — | — | — |
| 150 | 5.0 | 5.5 | 10 | 17.8 | — | — | — | — | — |
| 150 | 5.0 | 5.5 | 30 | 61.8 | 8.2 | 4.0 | — | — | — |
| 150 | 5.0 | 5.5 | 60 | 99.2 | — | — | — | — | — |
| 150 | 5.0 | 5.5 | 90 | 102.6 | — | — | — | — | — |
| 150 | 5.0 | 5.5 | 120 | 94.7 | — | — | — | — | — |
| 150 | 5.0 | 6.5 | 10 | 23.4 | — | — | — | — | — |
| 150 | 5.0 | 6.5 | 30 | 52.8 | — | — | — | — | — |
| 150 | 5.0 | 6.5 | 60 | 97.6 | — | — | — | — | — |
| 150 | 5.0 | 6.5 | 90 | 100.9 | — | — | — | — | — |
| 150 | 5.0 | 6.5 | 120 | 108.5 | — | — | — | — | — |
| 180 | 10 | 1.0 | 60 | 34.3 | — | — | — | — | — |
| 180 | 10 | 2.0 | 60 | 73.5 | — | — | — | — | — |
| 180 | 10 | 3.0 | 60 | 96.8 | — | — | — | — | — |
| 180 | 10 | 4.0 | 60 | 122.0 | — | — | — | — | — |
| 180 | 10 | 5.0 | 10 | 50.8 | — | — | — | — | — |
| 180 | 10 | 5.0 | 30 | 128.3 | — | — | — | — | — |
| 180 | 10 | 5.0 | 60 | 118.6 | — | — | — | — | — |
| 180 | 10 | 5.0 | 90 | 107.1 | — | — | — | — | — |
| 180 | 10 | 5.0 | 120 | 117.8 | — | — | — | — | — |
| 180 | 10 | 5.5 | 10 | 85.9 | 11.2 | 4.0 | 66.9 | 2.9 | — |
| 180 | 10 | 5.5 | 30 | 132.8 | 11.4 | 2.5 | 90.2 | 3.6 | — |
| 180 | 10 | 5.5 | 80 | 135.2 | — | — | — | — | — |
| 180 | 10 | 5.5 | 90 | 116.4 | — | — | — | — | — |
| 180 | 10 | 5.5 | 120 | 117.1 | — | — | — | — | — |
| 180 | 10 | 6.5 | 10 | 94.6 | — | — | — | — | — |
| 180 | 10 | 6.8 | 30 | 125.8 | — | — | — | — | 0.46 |
| 180 | 10 | 6.5 | 60 | 137.8 | — | — | — | — | — |
| 180 | 10 | 6.8 | 90 | 110.8 | — | — | — | — | — |
| 180 | 10 | 6.5 | 120 | 121.2 | — | — | — | — | — |
| 210 | 20 | 1.0 | 80 | 106.3 | — | — | — | — | — |

Figure 11:
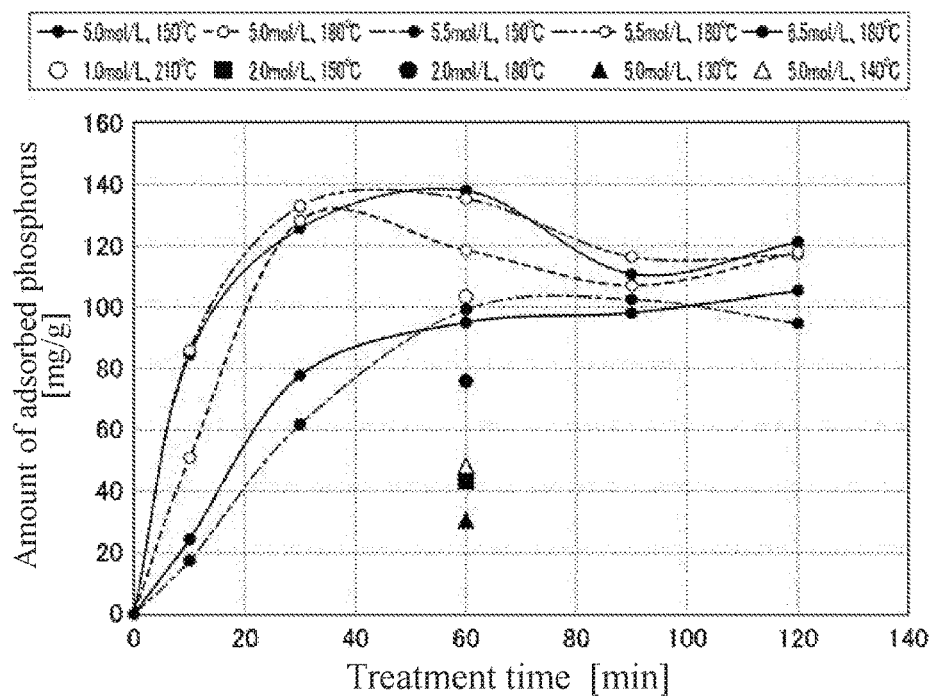
FIG. 11 is a graph which shows a relationship between the treatment time of high temperature alkali treatment and the amount of adsorbed phosphorus.

From the results in FIG. 11, it is found that an excellent ability to adsorb phosphate anion was obtained in a short reaction time such as 10 minutes, 30 minutes or an hour by the alkali treatment under the above conditions, and particularly found that as the concentration and temperature of an alkaline solution increased, an excellent ability to adsorb phosphate anion was obtained even when the treatment time was short.

It is found that, for example, a case where foam glass obtained by an alkali treatment at an alkaline solution temperature (treatment temperature) of 150° C. or higher and a NaOH concentration in an alkaline solution of 5.0 mol/L or more for 30 minutes was used as an adsorbent, showed an excellent ability to adsorb phosphate anion, 60 mg/g or more.

In particular, it is found that a case where foam glass obtained by an alkali treatment at an alkaline solution temperature (treatment temperature) of 180° C. or higher and a NaOH concentration in an alkaline solution of 5.0 mol/L or more for 30 minutes was used as an adsorbent, showed a particularly excellent ability to adsorb phosphate anion, 100 mg/g or more.

It is found that, for example, a case where foam glass obtained by an alkali treatment at an alkaline solution temperature (treatment temperature) of 180° C. or higher and a NaOH concentration in an alkaline solution of 5.0 mol/L or more for 10 minutes was used as an adsorbent, showed an excellent ability to adsorb phosphate anion, 40 mg/g or more.

In particular, it is found that a case where foam glass obtained by an alkali treatment at an alkaline solution temperature (treatment temperature) of 180° C. or higher and a NaOH concentration in an alkaline solution of 5.5 mol/L or more for 10 minutes was used as an adsorbent, showed an excellent ability to adsorb phosphate anion, 60 mg/g or more.

The method for producing the anionic substance-adsorbent of the present invention has been described particularly from the aspects of concentration dependence, temperature dependence and treatment time dependence of an alkaline solution in adsorption of phosphate anion using FIGS. 9 to 11 and Table 2. As described above, a unique amount of adsorbed anionic substances [mg/g] is determined by three parameters of concentration, temperature and time. In other words, the anionic substance-adsorbent of the present invention can be produced by regulating treatment temperature, alkali concentration and treatment time depending on the required amount of adsorbed anionic substances [mg/g].

In addition, the anionic substance-adsorbents in the above Examples had both an excellent ability to adsorb anionic substances, and handling properties of a foam glass material in actual use (for example, adding it to polluted water in which anionic substances are to be adsorbed, drawing it from the polluted water, and separating it from polluted sludge after drawing).

Test Example 7

In Test Example 7, when a foam glass material was subjected to a high pressure treatment, the influence of the temperature of an alkaline solution and the treatment pressure on the amount of adsorbed phosphate anion was examined.

Specifically, the foam glass material A used in Test Example 1 was subjected to a high pressure treatment for an hour while adjusting the concentration of NaOH in an alkaline solution to 5.0 mol/L, the temperature of an alkaline solution to 80° C. or 95° C., and the treatment pressure to 0, 100, 1000 or 6000 atmospheres to produce foam glasses. In addition, a foam glass material B produced using silicon carbide as a foaming agent was prepared. This foam glass material B was subjected to the same high pressure treatment as for the foam glass material A to produce foam glasses. A foam glass produced in each of these conditions was used as an adsorbent, and the amount of adsorbable phosphate anion was measured by the above-described [method for measuring amount of adsorbable phosphate anion in high concentration phosphate anion solution]. The results are shown as the amount of adsorbed phosphorus [relative amount] in FIG. 12.

Figure 12:
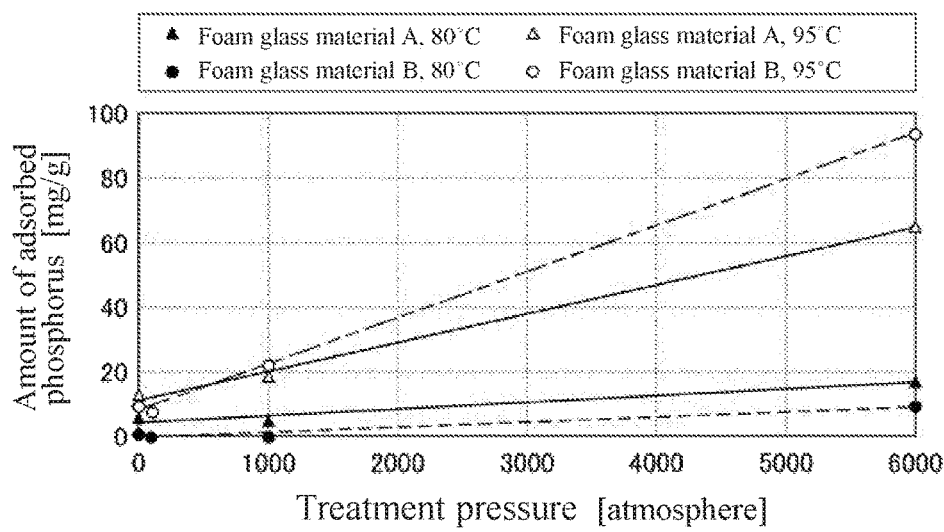
FIG. 12 is a graph which shows a relationship between the treatment pressure of high pressure treatment and the amount of adsorbed phosphorus.

As can be seen from the results in FIG. 12, in the case of a high pressure treatment under the condition of an alkaline solution temperature of 95° C., as the treatment pressure increased to 100 atmospheres or more, the adsorbed phosphorus amount by an adsorbent considerably increased compared to the case of a high pressure treatment under the condition of an alkaline solution temperature of 80° C. in both cases of the foam glass material A and the foam glass material B. In addition, it was verified that an adsorbent produced by a high pressure treatment at 6000 atmospheres at an alkaline solution temperature of 95° C. showed a particularly excellent adsorbed phosphorus amount.

Test Example 8

The adsorption ability of an adsorbent (the amount of adsorbed fluoride ion) was evaluated based on the concentration of Ca2p and the concentration of Na1s on the surface of the adsorbent by XPS analysis.

Conditions of XPS measurement were as follows:
Used equipment: Scanning XPS analyzer (PHI 5000 VersaProbe II manufactured by ULVAC-PHI, Inc.),
X-ray source: monochrome AlK α (1486.6 eV) ray, output 25 W,
Analyzed area: 100 μmφ, and
Pass energy: 187.85 eV (wide scan), 58.70 eV (narrow scan).

Specifically, as in Test Example 1, a foam glass material A produced using calcium carbonate as a foaming agent was prepared. This foam glass material A was subjected to a high temperature alkali treatment by a sodium hydroxide solution with a NaOH concentration of 5.5 mol/L while properly adjusting the treatment pressure, treatment temperature and treatment time to produce adsorbents in which the concentration of Ca2p and the concentration of Na1s on the foam glass surface were adjusted (the particle diameter of the foam glass material was 0.4 to 1.0 cm in diameter). The peak region of Si2p of the foam glass material A (before alkali treatment) by XPS analysis was 2.2 eV as in Test Example 1, and the full width at half maximum of the Si2p peak of the foam glass material A after the high temperature alkali treatment was 2.4 eV or more.

Figure 13:
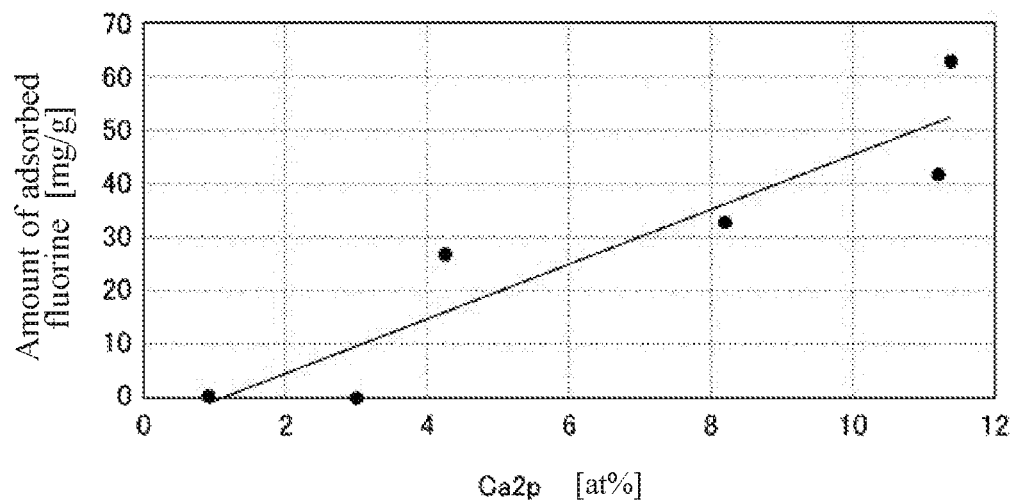
FIG. 13 is a graph which shows a relationship between the concentration of Ca2p on the surface of an adsorbent and the amount of adsorbed fluorine.
Figure 14:
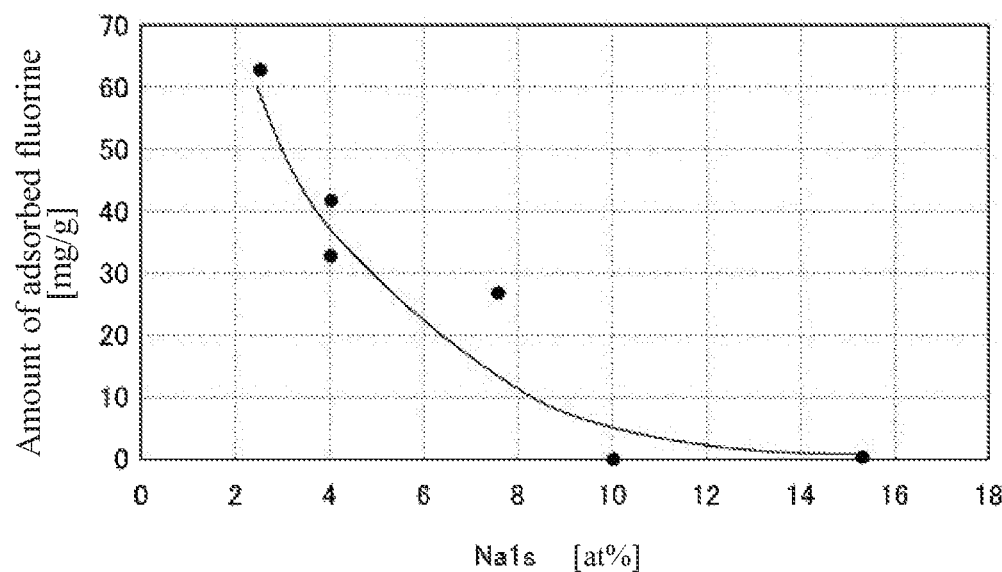
FIG. 14 is a graph which shows a relationship between the concentration of Na1s on the surface of an adsorbent and the amount of adsorbed fluorine.

Next, the amounts of fluoride ion adsorbed by the adsorbents each having different Ca2p concentrations and Na1s concentrations were each measured by the [method for measuring amount of adsorbable fluoride ion in high concentration fluoride ion solution] described in the above-described "MODE FOR CARRYING OUT THE INVENTION." The results are shown as the amount of adsorbed fluorine [mg/g] in FIG. 13 and FIG. 14.

The results in FIG. 13 and FIG. 14 verified that as the concentration of Ca2p on the surface of an adsorbent increased, the amount of adsorbed fluorine increased, and as the concentration of Na1s on the surface of an adsorbent decreased, the amount of adsorbed fluorine increased. When the concentration of Ca2p was 3.0 at % or more and the concentration of Na1s was 8.5 at % or less on the surface of an adsorbent, the amount of adsorbable fluoride ion was 10 mg/g or more, which verified that an excellent adsorption ability was shown. In addition, when the concentration of Ca2p was 5.0 atom % or more and the concentration of Na1s was 6.5 atom % or less on the surface of an adsorbent, the amount of adsorbed fluoride ion was 20 mg/g or more, which verified that a more excellent adsorption ability was shown.

In addition, the results in FIG. 3 and FIG. 4 verified that the full width at half maximum in the foam glass material A was narrow due to increased —$SiO_2$ and decreased —SiOX, while the full width at half maximum in foam glass, which becomes an adsorbent, was large due to decreased —$SiO_2$ and increased —SiOX by the alkali treatment. In this adsorbent (foam glass) in which the full width at half maximum is 2.4 eV or more, —SiOX, the basic skeleton of glass, remains without being destroyed even after the alkali treatment, and this —SiOX contributes to the adsorption of fluoride ion to show an ability to adsorb fluoride ion.

Test Example 9

The amount of fluoride ion adsorbed by an adsorbent was evaluated based on the specific surface area and pore volume by a mercury intrusion method. In addition, the amount of fluoride ion adsorbed by an adsorbent was evaluated based on the density measured by the method described in the above-described "MODE FOR CARRYING OUT THE INVENTION."

Figure 16:
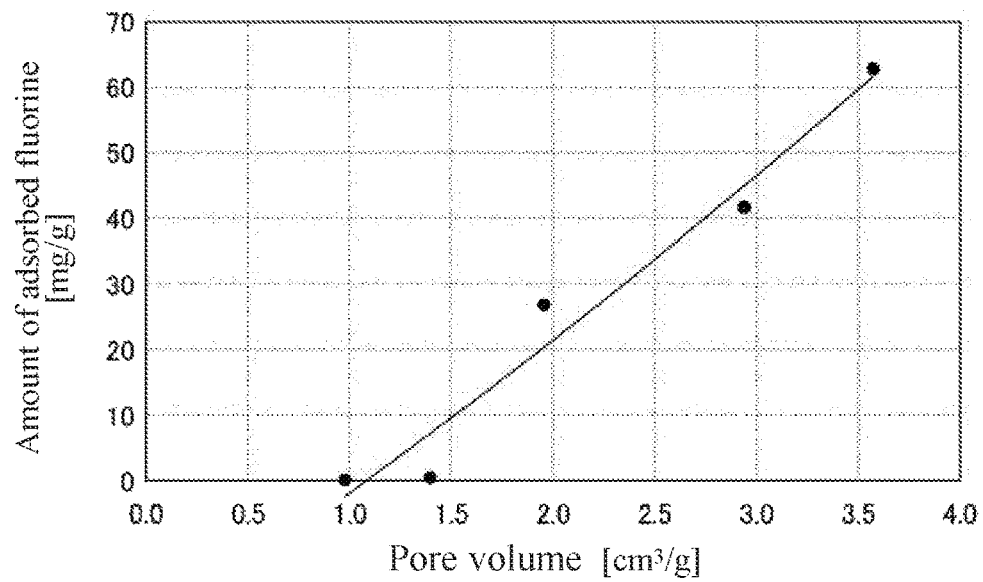
FIG. 16 is a graph which shows a relationship between the pore volume of an adsorbent and the amount of adsorbed fluorine.
Figure 17:
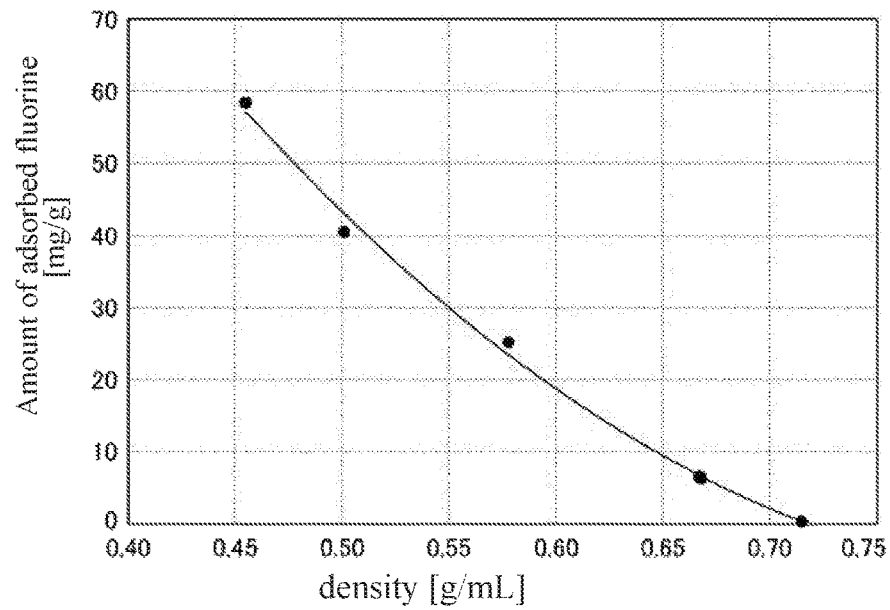
FIG. 17 is a graph which shows a relationship between the density of an adsorbent and the amount of adsorbed fluorine.

Specifically, the foam glass material A prepared in Test Example 1 was subjected to a high temperature alkali treatment by a sodium hydroxide solution with a NaOH concentration of 5.5 mol/L while properly adjusting the treatment pressure, treatment temperature and treatment time to produce adsorbents in which the specific surface area, pore volume and density on the foam glass surface were adjusted. The amounts of fluorine adsorbable by the adsorbents each having different specific surface areas, pore volumes and densities were each measured by the above-described [method for measuring amount of adsorbable fluoride ion in high concentration fluoride ion solution]. The results are shown as the amount of adsorbed fluorine [mg/g] in FIG. 15 to FIG. 17.

Figure 15:
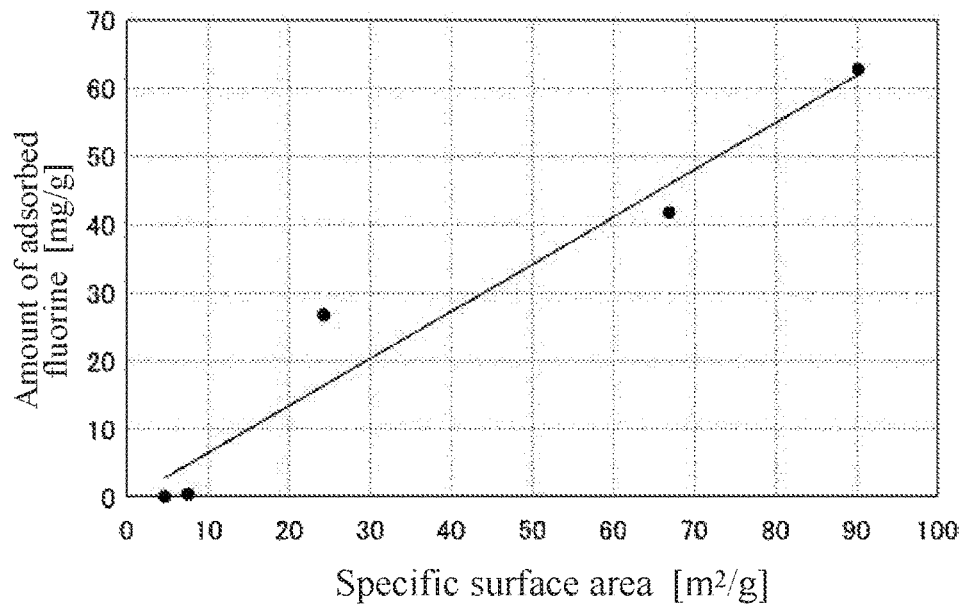
FIG. 15 is a graph which shows a relationship between the specific surface area of an adsorbent and the amount of adsorbed fluorine.

The results in FIG. 15 verified that as the specific surface area of an adsorbent increased, the amount of adsorbed fluorine increased. In addition, the results in FIG. 16 verified that as the pore volume of an adsorbent increased, the amount of adsorbed fluorine increased. In addition, the results in FIG. 17 verified that as the density of an adsorbent decreased, the amount of adsorbed fluorine increased.

When the specific surface area of an adsorbent was 15 $m^2/g$ or more, the pore volume was 1.5 $cm^3/g$ or more, or the density was 0.65 g/mL or less, the amount of adsorbable fluoride ion was 10 mg/g or more in all cases, which verified that an excellent ability to adsorb fluoride ion was shown.

In addition, when the specific surface area of an adsorbent was 30 $m^2/g$ or more, the pore volume was 1.8 $cm^3/g$ or more, or the density was 0.58 g/mL or less, the amount of adsorbable fluoride ion was 20 mg/g or more in all cases, which verified that an excellent ability to adsorb fluoride ion was shown.

Test Example 10

In Test Example 10, when a foam glass material was subjected to an alkali treatment, the influence of the concentration of NaOH and temperature of an alkaline solution on the amount of adsorbed fluoride ion, and a relationship between the treatment time and the amount of adsorbed fluoride ion were examined.

Specifically, the foam glass material A used in Test Example 1 was subjected to an alkali treatment while adjusting the concentration of NaOH in an alkaline solution to 1.0 to 6.5 mol/L, the temperature of an alkaline solution to 80 to 180° C., the treatment pressure to 0.5 to 10 atmospheres (pressure was applied by the vapor pressure of water using a closed container) to produce foam glasses. A foam glass produced in each of these conditions was used as an adsorbent, and the amount of adsorbable fluoride ion was measured by the above-described [method for measuring amount of adsorbable fluoride ion in high concentration fluoride ion solution]. The results are shown as the amount of adsorbed fluorine [mg/g] in Table 3 and FIGS. 18 to 20 (Table 3 also includes the test results shown in FIGS. 13 to 17).

TABLE 3

| Treatment temperature [° C.] | Treatment pressure [atmosphere] | NaOH concentration [mol/L] | Treatment time [min] | Amount of adsorbed fluorine [mg/g] | Ca2p [at %] | Na1s [at %] | Specific surface area [$m^2/g$] | Pore volume [$cm^3/g$] | Specific gravity [g/mL] |
|---|---|---|---|---|---|---|---|---|---|
| untreated | untreated | untreated | untreated | 0.0 | 3.0 | 10.0 | 4.7 | 1.0 | — |
| 80 | 0.5 | 1.0 | 60 | 1.9 | — | — | — | — | — |
| 80 | 0.5 | 2.0 | 60 | 2.5 | — | — | — | — | — |
| 80 | 0.5 | 5.0 | 60 | 0.8 | — | — | — | — | — |
| 80 | 0.5 | 5.5 | 60 | 0.0 | — | — | — | — | — |
| 80 | 0.5 | 6.5 | 60 | 0.3 | — | — | — | — | — |
| 100 | 1.0 | 1.0 | 60 | 3.7 | — | — | — | — | — |
| 100 | 1.0 | 2.0 | 60 | 2.7 | — | — | — | — | — |
| 100 | 1.0 | 5.0 | 60 | 3.2 | — | — | — | — | — |
| 100 | 1.0 | 5.5 | 60 | 0.4 | 0.9 | 15.3 | 7.5 | 1.4 | 0.72 |
| 100 | 1.0 | 6.5 | 60 | 0.9 | — | — | — | — | — |
| 120 | 2.0 | 1.0 | 60 | 5.1 | — | — | — | — | — |
| 120 | 2.0 | 2.0 | 60 | 6.9 | — | — | — | — | — |
| 120 | 2.0 | 5.0 | 60 | 6.3 | — | — | — | — | 0.67 |
| 120 | 2.0 | 5.0 | 960 | 74.8 | — | — | — | — | — |
| 120 | 2.0 | 5.5 | 60 | 6.5 | — | — | — | — | 0.67 |
| 120 | 2.0 | 6.5 | 60 | 6.4 | — | — | — | — | — |
| 130 | 3.0 | 6.0 | 60 | 13.3 | — | — | — | — | — |
| 130 | 3.0 | 5.5 | 60 | 11.7 | — | — | — | — | — |
| 130 | 3.0 | 6.5 | 60 | 14.3 | — | — | — | — | — |
| 140 | 4.0 | 5.0 | 60 | 36.1 | — | — | — | — | — |
| 140 | 4.0 | 5.5 | 60 | 26.8 | 4.3 | 7.6 | 24.3 | 2.0 | — |
| 140 | 4.0 | 6.5 | 60 | 25.2 | — | — | — | — | 0.58 |
| 150 | 5.0 | 1.0 | 60 | 15.9 | — | — | — | — | — |
| 150 | 5.0 | 2.0 | 60 | 27.0 | — | — | — | — | — |
| 150 | 5.0 | 3.0 | 60 | 40.5 | — | — | — | — | — |
| 150 | 5.0 | 4.0 | 60 | 50.6 | — | — | — | — | — |
| 150 | 5.0 | 5.0 | 10 | 12.1 | — | — | — | — | — |
| 150 | 5.0 | 5.0 | 30 | 40.5 | — | — | — | — | 0.50 |
| 150 | 5.0 | 5.0 | 80 | 50.5 | — | — | — | — | — |
| 150 | 5.0 | 5.0 | 90 | 88.4 | — | — | — | — | — |
| 150 | 5.0 | 5.0 | 120 | 73.0 | — | — | — | — | — |
| 150 | 5.0 | 5.5 | 10 | 10.8 | — | — | — | — | — |
| 150 | 5.0 | 5.5 | 30 | 32.8 | 8.2 | 4.0 | — | — | — |
| 150 | 5.0 | 5.5 | 60 | 49.5 | — | — | — | — | — |
| 150 | 5.0 | 5.5 | 90 | 70.0 | — | — | — | — | — |
| 150 | 5.0 | 5.5 | 120 | 70.3 | — | — | — | — | — |
| 150 | 5.0 | 0.5 | 10 | 20.1 | — | — | — | — | — |
| 150 | 5.0 | 6.5 | 30 | 31.8 | — | — | — | — | — |
| 150 | 5.0 | 6.5 | 60 | 57.0 | — | — | — | — | — |
| 150 | 5.0 | 6.5 | 90 | 65.4 | — | — | — | — | — |
| 150 | 5.0 | 6.5 | 120 | 71.0 | — | — | — | — | — |
| 180 | 10 | 1.0 | 60 | 29.8 | — | — | — | — | — |
| 180 | 10 | 2.0 | 60 | 30.2 | — | — | — | — | — |
| 180 | 10 | 3.0 | 60 | 52.9 | — | — | — | — | — |
| 180 | 10 | 4.0 | 60 | 63.4 | — | — | — | — | — |

TABLE 3-continued

| Treatment temperature [° C.] | Treatment pressure [atmosphere] | NaOH concentration [mol/L] | Treatment time [min] | Amount of adsorbed fluorine [mg/g] | Ca2p [at %] | Na1s [at %] | Specific surface area [m²/g] | Pore volume [cm³/g] | Specific gravity [g/mL] |
|---|---|---|---|---|---|---|---|---|---|
| 180 | 10 | 5.0 | 10 | 54.5 | — | — | — | — | — |
| 180 | 10 | 5.0 | 30 | 60.8 | — | — | — | — | — |
| 180 | 10 | 5.0 | 80 | 67.2 | — | — | — | — | — |
| 180 | 10 | 2.0 | 90 | 65.5 | — | — | — | — | — |
| 180 | 10 | 5.0 | 120 | 77.7 | — | — | — | — | — |
| 180 | 10 | 5.5 | 10 | 41.7 | 11.2 | 4.0 | 66.9 | 2.9 | — |
| 180 | 10 | 5.5 | 30 | 62.8 | 11.4 | 2.5 | 90.2 | 3.6 | — |
| 180 | 10 | 5.5 | 60 | 67.1 | — | — | — | — | — |
| 180 | 10 | 5.5 | 90 | 71.4 | — | — | — | — | — |
| 180 | 10 | 5.5 | 120 | 81.4 | — | — | — | — | — |
| 180 | 10 | 6.5 | 10 | 46.0 | — | — | — | — | — |
| 180 | 10 | 6.5 | 30 | 58.4 | — | — | — | — | 0.46 |
| 180 | 10 | 6.5 | 60 | 69.7 | — | — | — | — | — |
| 180 | 10 | 6.5 | 90 | 86.1 | — | — | — | — | — |
| 180 | 10 | 6.5 | 120 | 85.7 | — | — | — | — | — |

Figure 18:
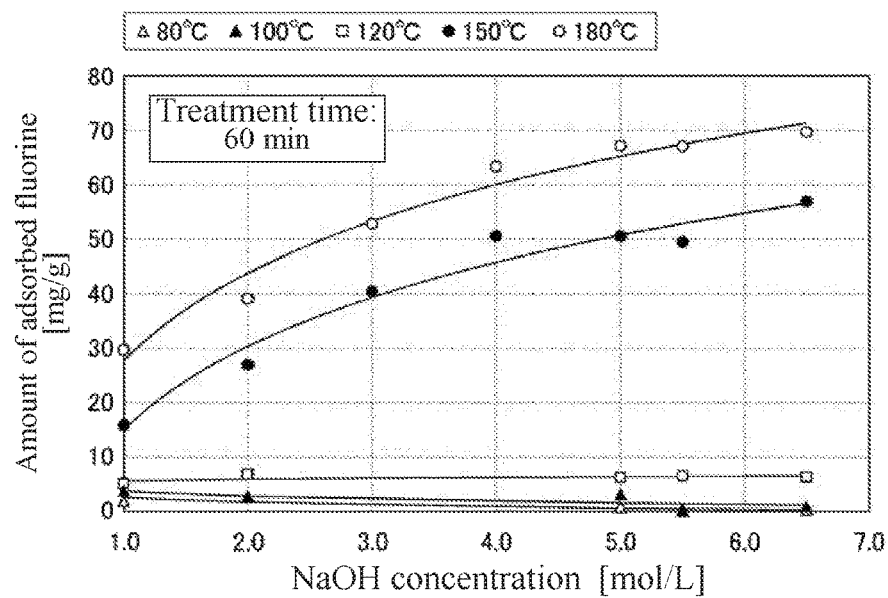
FIG. 18 is a graph which shows a relationship between the concentration of NaOH in an alkaline solution and the amount of adsorbed fluorine.
Figure 19:
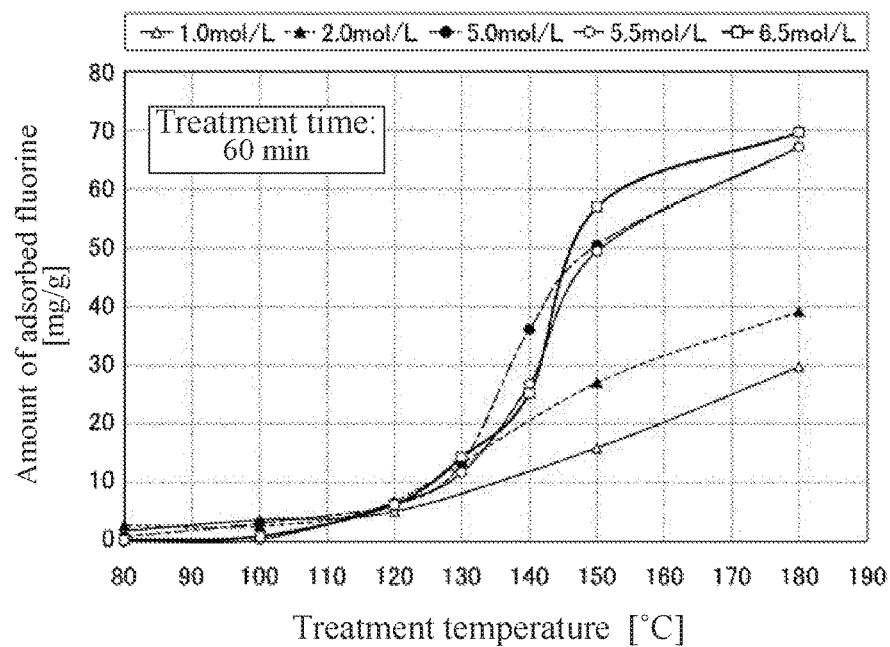
FIG. 19 is a graph which shows a relationship between the temperature of an alkaline solution and the amount of adsorbed fluorine.
Figure 20:
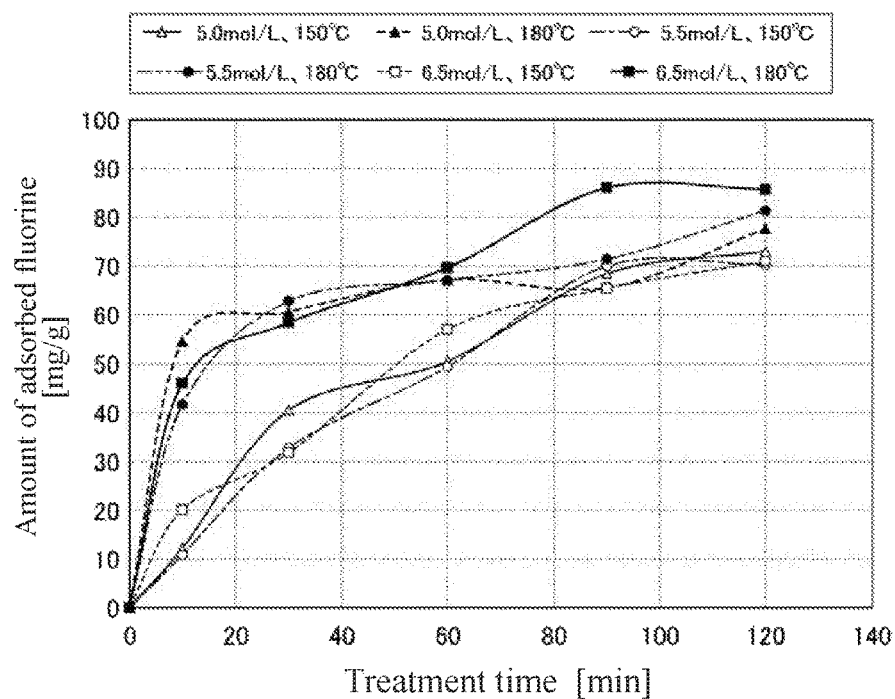
FIG. 20 is a graph which shows a relationship between the treatment time of high temperature alkali treatment and the amount of adsorbed fluorine.

From the results in FIGS. 18 to 20, it was found that an excellent ability to adsorb fluoride ion was obtained in a short reaction time such as 10 minutes, 30 minutes, an hour or 1.5 hours by an alkali treatment on the above-described conditions, and particularly it was found that as the concentration and temperature of an alkaline solution increased, an excellent ability to adsorb fluoride ion was obtained even in a short treatment time.

It was found that, for example, a case where foam glass obtained by an alkali treatment at an alkaline solution temperature (treatment temperature) of 130° C. or higher and a NaOH concentration in an alkaline solution of 5.0 mol/L or more for 60 minutes was used as an adsorbent, showed an excellent ability to adsorb fluoride ion, 10 mg/g or more.

It was found that, for example, a case where foam glass obtained by an alkali treatment at an alkaline solution temperature (treatment temperature) of 140° C. or higher and a NaOH concentration in an alkaline solution of 5.0 mol/L or more for 60 minutes was used as an adsorbent, showed an excellent ability to adsorb fluoride ion, 20 mg/g or more.

It was found that, for example, a case where foam glass obtained by an alkali treatment at an alkaline solution temperature (treatment temperature) of 150° C. or higher and a NaOH concentration in an alkaline solution of 1.0 mol/L or more for 60 minutes was used as an adsorbent, showed an excellent ability to adsorb fluoride ion, 10 mg/g or more.

In particular, it was found that a case where foam glass obtained by an alkali treatment at an alkaline solution temperature (treatment temperature) of 150° C. or higher and a NaOH concentration in an alkaline solution of 6.5 mol/L or more for 10 minutes was used as an adsorbent, showed an excellent ability to adsorb fluoride ion, 20 mg/g or more.

It was also found that a case where foam glass obtained by an alkali treatment at an alkaline solution temperature (treatment temperature) of 150° C. or higher and a NaOH concentration in an alkaline solution of 5.0 mol/L or more for 30 minutes was used as an adsorbent, showed an excellent ability to adsorb fluoride ion, 30 mg/g or more.

It was also found that a case where foam glass obtained by an alkali treatment at an alkaline solution temperature (treatment temperature) of 150° C. or higher and a NaOH concentration in an alkaline solution of 5.0 mol/L or more for 60 minutes was used as an adsorbent, showed an excellent ability to adsorb fluoride ion, 50 mg/g or more.

It was found that, for example, a case where foam glass obtained by an alkali treatment at an alkaline solution temperature (treatment temperature) of 180° C. or higher and a NaOH concentration in an alkaline solution of 1.0 mol/L or more for 60 minutes was used as an adsorbent, showed an excellent ability to adsorb fluoride ion, 25 mg/g or more.

In particular, it was found that a case where foam glass obtained by an alkali treatment at an alkaline solution temperature (treatment temperature) of 180° C. or higher and a NaOH concentration in an alkaline solution of 5.0 mol/L or more for 10 minutes was used as an adsorbent, showed a particularly excellent ability to adsorb fluoride ion, 40 mg/g or more.

The method for producing the anionic substance-adsorbent of the present invention has been described particularly from the aspects of concentration dependence, temperature dependence and treatment time dependence of an alkaline solution in adsorption of fluoride ion using FIGS. 18 to 20 and Table 3. As described above, a unique amount of adsorbed anionic substances [mg/g] is determined by three parameters of concentration, temperature and time. In other words, the anionic substance-adsorbent of the present invention can be produced by regulating treatment temperature, alkali concentration and treatment time depending on the required amount of adsorbed anionic substances [mg/g].

In addition, the anionic substance-adsorbents in the above Examples had both an excellent ability to adsorb anionic substances, and handling properties of a foam glass material in actual use (for example, adding it to polluted water in which anionic substances are to be adsorbed, drawing it from the polluted water, and separating it from polluted sludge after drawing).

Test Example 11

An adsorbent having adsorbed phosphate anion was treated to desorb phosphoric acid using nitric acid, and the recycle rate of phosphate anion was examined.

Specifically, an adsorbent which had adsorbed phosphate anion at 99.6 mg/g, and a nitric acid solution with a predetermined concentration were added to a container, and the obtained mixture was stirred in a thermostatic bath set to 25° C. for 2 or 4 hours. After completion of stirring, centrifugation was carried out at 3000 rpm for 10 minutes, and the concentration of phosphate anion in a supernatant liquid was measured using an absorptiometer by a molybdenum blue method. The recycle rate of phosphate anion was calculated based on the measurement value. The results are shown in Table 4.

TABLE 4

| Added amount of adsorbent [g] | Concentration of nitric acid [mol/L] | Stirring time [hour] | pH of supernatant liquid | Concentration of phosphoric anion in supernatant liquid [mg/L] | Recycle rate of phosphoric anion [%] |
|---|---|---|---|---|---|
| 0.215 | 0.1 | 4 | 1.57 | 1095 | 102 |
| 0.211 | 1 | 2 | 0 or less | 1015 | 97 |

The results in Table 4 verified that phosphate anion could be recycled from an adsorbent having adsorbed phosphate anion at a high recycle rate.

The anionic substance-adsorbent of the present invention has been described. In the above Examples, phosphorus (phosphate anion and the like), fluorine (fluoride ion and the like) have been shown; however, the anionic substance-adsorbent of the present invention is not used only to adsorb these, and also has an ability to adsorb other anionic substances such as boric acid, and thus can be used as an adsorbent.

The invention claimed is:

1. A method for producing an anionic substance-adsorbent, comprising:

a step of treating a foam glass material in an alkaline solution containing an alkali metal hydroxide in an amount of 3 mol/L or more at a temperature of 150° C. or higher for a predetermined time, wherein a concentration of the alkali metal hydroxide, the temperature, and the time are selected so that an amount of phosphate anion adsorbable by the adsorbent is 60 mg/g or more, calculated by absorptiometry, after stirring the adsorbent using a 3000 mg/L phosphate anion solution at 25° C. for 2 hours, and the predetermined time is a time period of 10 seconds or more and 1.5 hours or less, wherein the foam glass material is produced using a foaming agent comprising calcium carbonate.

* * * * *